United States Patent
Bieg et al.

(10) Patent No.: US 6,519,860 B1
(45) Date of Patent: Feb. 18, 2003

(54) POSITION FEEDBACK CONTROL SYSTEM

(75) Inventors: Lothar F. Bieg, Albuquerque, NM (US); Bernhard Jokiel, Jr., Albuquerque, NM (US); Mark T. Ensz, Albuquerque, NM (US); Robert D. Watson, Tijeras, NM (US)

(73) Assignee: Sandia Corporation, Albuquerque, NM (US)

( * ) Notice: Subject to any disclaimer, the term of this patent is extended or adjusted under 35 U.S.C. 154(b) by 32 days.

(21) Appl. No.: 09/692,024

(22) Filed: Oct. 19, 2000

(51) Int. Cl.$^7$ .............................. G01B 5/00; G01B 5/008
(52) U.S. Cl. ............................ 33/503; 33/1 PT; 33/502; 33/556; 73/1.79; 700/254
(58) Field of Search ................................ 33/1 PT, 502, 33/503, 549, 555, 556, 559, DIG. 1; 73/1.79; 700/254

(56) References Cited

U.S. PATENT DOCUMENTS

| | | | |
|---|---|---|---|
| 3,628,002 A | 12/1971 | Meese et al. | 235/151.11 |
| 4,272,818 A | 6/1981 | McDaniel | 364/118 |
| 4,338,659 A | 7/1982 | Kurakake | 364/170 |
| 4,365,301 A | 12/1982 | Arnold et al. | 364/475 |
| 4,372,721 A * | 2/1983 | Harjar et al. | 73/1.79 |
| 4,435,905 A * | 3/1984 | Bryan | 33/DIG. 1 |
| 4,486,955 A * | 12/1984 | Fisher et al. | 33/1 PT |
| 4,676,002 A * | 6/1987 | Slocum | 33/503 |
| 4,703,443 A * | 10/1987 | Moriyasu | 33/503 |
| 4,945,501 A | 7/1990 | Bell et al. | 364/571.05 |
| 5,218,769 A * | 6/1993 | Tranchon | 33/1 PT |
| 5,341,574 A * | 8/1994 | Bieg | 33/502 |
| 5,611,147 A * | 3/1997 | Raab | 33/1 PT |
| 5,681,981 A | 10/1997 | McMurtry | 73/1 J |
| 5,687,293 A * | 11/1997 | Snell | 700/254 |
| 5,714,674 A * | 2/1998 | Tsukuda et al. | 73/1.79 |
| 5,768,792 A * | 6/1998 | Raab | 33/503 |
| 5,834,623 A | 11/1998 | Ignagni | 73/1 E |
| 5,841,668 A | 11/1998 | Pahk et al. | 364/551.01 |
| 5,903,459 A | 5/1999 | Greenwood et al. | 364/468.17 |
| 5,907,229 A * | 5/1999 | Snell | 73/1.79 |
| 5,978,748 A * | 11/1999 | Raab | 33/503 |
| 6,134,506 A * | 10/2000 | Rosenberg et al. | 33/502 |
| 6,317,699 B1 * | 11/2000 | Watanabe et al. | 700/254 |
| 6,205,839 B1 * | 3/2001 | Brog.ang.rdh et al. | 73/1.79 |

OTHER PUBLICATIONS

Bernhard Jokiel, Jr., Lothar F. X. Bieg, and Mark Ensz, *Development of an Independent Real–time Position Feedback Device for CNC Machining Operations*, Proc. Of the American Society for Precision Engineering Winter 2000 Annual Meeting, Scottsdale, AZ.

* cited by examiner

*Primary Examiner*—Diego Gutierrez
*Assistant Examiner*—Madeline Gonzalez
(74) *Attorney, Agent, or Firm*—Robert D. Watson

(57) ABSTRACT

Disclosed is a system and method for independently evaluating the spatial positional performance of a machine having a movable member, comprising an articulated coordinate measuring machine comprising: a first revolute joint; a probe arm, having a proximal end rigidly attached to the first joint, and having a distal end with a probe tip attached thereto, wherein the probe tip is pivotally mounted to the movable machine member; a second revolute joint; a first support arm serially connecting the first joint to the second joint; and coordinate processing means, operatively connected to the first and second revolute joints, for calculating the spatial coordinates of the probe tip; means for kinematically constraining the articulated coordinate measuring machine to a working surface; and comparator means, in operative association with the coordinate processing means and with the movable machine, for comparing the true position of the movable machine member, as measured by the true position of the probe tip, with the desired position of the movable machine member.

41 Claims, 35 Drawing Sheets

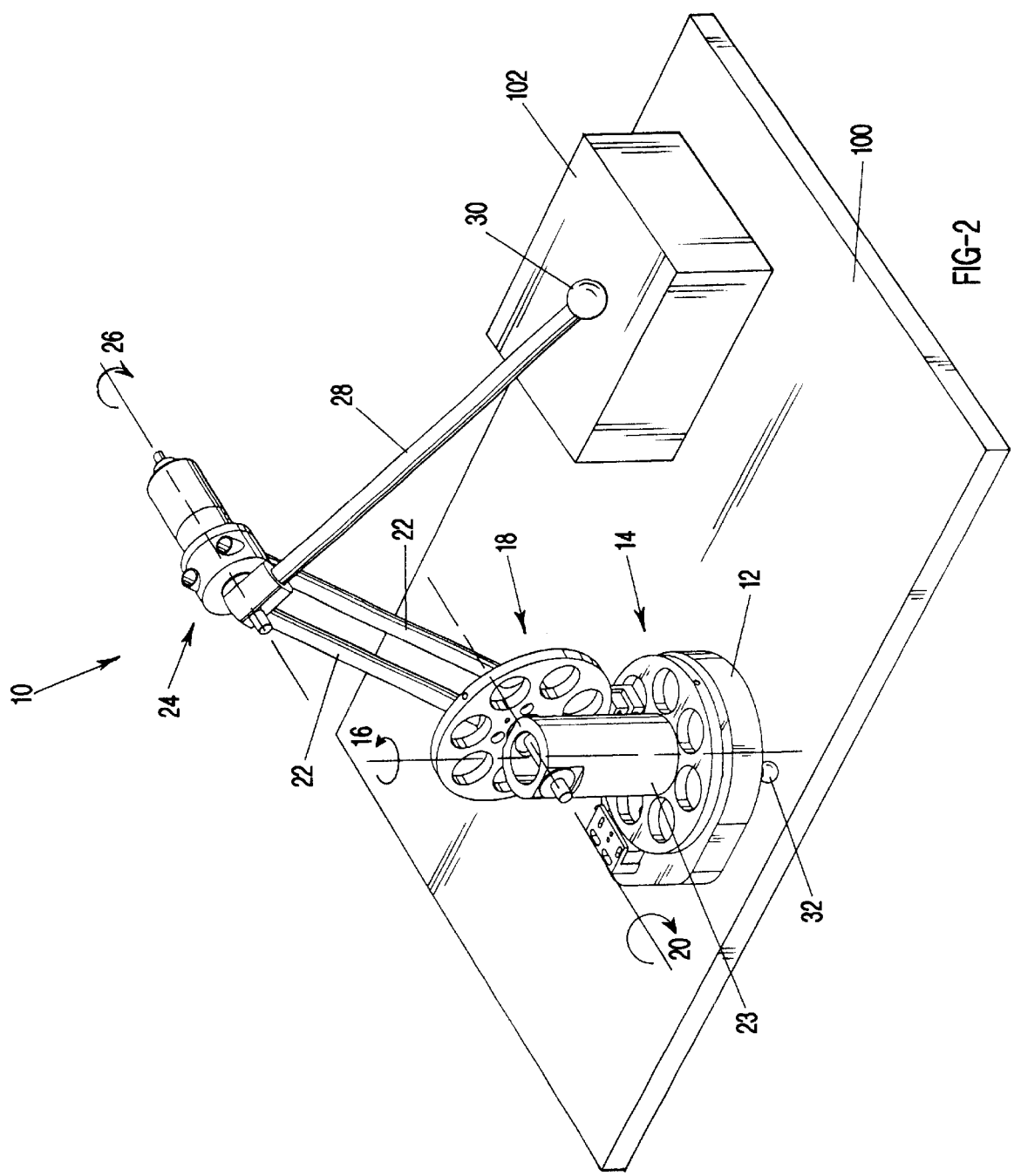

SEC 1-1

SEC. 1-1

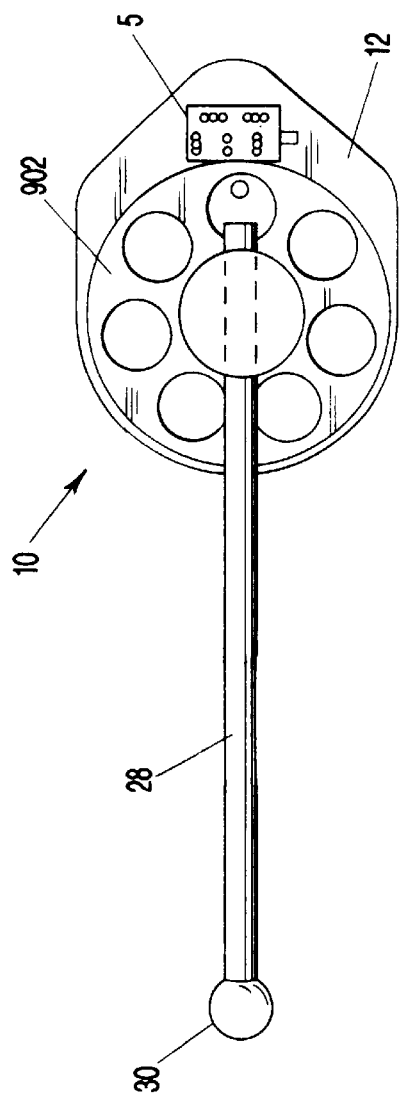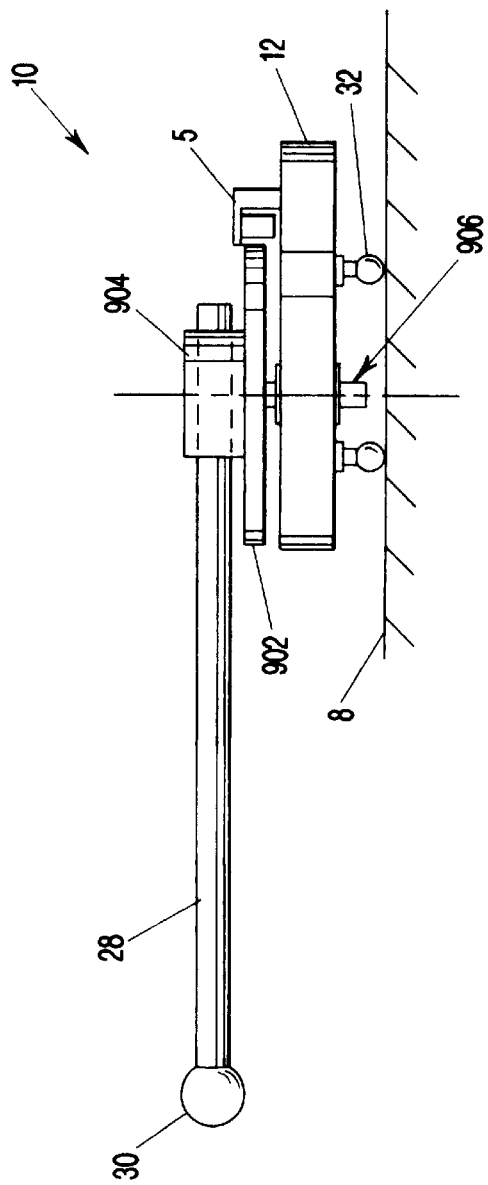
FIG-24A
FIG-24B

POSITION FEEDBACK CONTROL SYSTEM

CROSS-REFERENCE TO RELATED APPLICATIONS

This application is related to U.S. application Ser. No. 09/692,028, "Highly Accurate Articulated Coordinate Measuring Machine, by Lothar F. Bieg, et al. of Albuquerque, N. Mex., filed Oct. 19, 2000.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

This invention relates generally to the field of precision machining, and more specifically to an articulated coordinate measuring machine (ACMM), system, and method for providing independent, real-time position feedback control during precision machining.

Traditionally, the position of a movable machine member (e.g. tool holder or end effector) is determined indirectly by sensing motion at a large distance away from the actual point of operation. For example, the linear motion of a slide for a worktable is derived indirectly from rotational motion of a motor and lead screw combination by using a angle encoder or resolver. Another example is the use of a linear scale located adjacent to a guideway. These indirect methods have limited accuracy due to the well-known Abbe-offset error effect (e.g. comparator error). The accuracy can also be degraded by (1) thermal distortion effects induced by operation of the machine itself (e.g. motor heat from driving a tool under load, and spindle heating due to friction), or by an uncontrolled thermal environment; and (2) by progressive wear or aging of drive gears, guideways, etc. These problems become even more severe as the number of degrees of freedom (DOF) increases, such as a serially-linked 6-axis robotic arm manipulator, or a parallel-linked 6-axis Hexapod or Rotopod machine.

In-process inspection and Statistical Process Control requirements have forced the need to periodically re-certify the manufacturing process. Traceability of the machining process, and quick performance evaluation within the required workspace, can be critically important for small lot size and one-of-a-kind fabrication. The American National Standard ASME B5.54 provides rules for determining the three-dimensional positional performance of computer numerically controlled (CNC) systems. Satisfying the specifications of ASME B5.54 usually requires a multitude of expensive and sensitive equipment, applied by trained experts.

For straightness evaluation of a single machine tool axis, a laser interferometer or a series of calibrated, multiple-length gauge blocks can be used. For two-dimensional positional performance, a precision variable-length ball-bar is recommended. For three-dimensional positional performance (e.g. volumetric), the length of a fixed ball-bar should be measured in 20 different locations along the edges, face diagonals, and body diagonals of a cubical work zone. For non-cubical work zones, the number of positions can increase to 30–35 positions. A need exists, therefore, for a rapid, yet accurate multi-dimensional metrology system for calibrating precision machine tools.

Despite the need for increased accuracy and speed, such a metrology tool should remain a lightweight and portable unit. This would allow a single coordinate measuring machine (CMM) to periodically check and certify an entire shop floor having a multitude of equipment.

Statistical process control (SPC) has been successfully used for quality control of high volume manufacturing. However, as product diversity increases, and lot size decreases, the desire to minimize or eliminate independent product inspections has grown. This has created a new requirement for total process control (TPC), where all of the factors influencing the production process are detected, analyzed, and controlled, preferably in real-time. For this reason, an independent, real-time position feedback control system is needed to build Total Process Control (TPC) into the manufacturing process.

As explained above, real-time position measurement systems used on conventional precision machines suffer from a number of errors (e.g. comparator offset, thermal distortion, and wear of sliding surfaces). An ideal metrology system would directly measure the precise location of the actual cutting point of a machine tool, spray head, etc. during operation.

Laser trackers can provide non-contact, real-time measurement in three dimensions of a retroreflector sphere or cube mounted to a surface. These devices utilize a motorized, gimbal-mounted laser interferometer, which tracks the moving retroreflector (such as the SMX-4500 Laser Tracker manufactured by Spatial Metrix Corp., or a SMART310e Laser Tracker manufactured by Leica, Inc.). However, a laser retroreflector can not be practically mounted to an actual spinning drill bit or cutting tool. More importantly, if an object obstructs the laser beam, tracking can be lost. Operation must be paused to allow re-acquisition of the reflecting target mirror. Generation of cutting chips or small particles during machining operations and large volumes of cutting cooling fluids, can obstruct the laser beam and prevent useful application for real-time position control. End effectors mounted on the end of robotic arms, such as paint sprayers, thermal spray heads, plasma spray heads, sand blasters, grinders, etc. can also produce large volumes of particulates or dust that obscure laser beams, 3-D vision systems, or other non-contact sensors. 3-D laser tracking devices are generally very expensive, in the range of $ 125–250 K.

A need exists, therefore, for a position measurement device that remains in solid contact with the moving member, ideally as close as possible to the cutting tool or point of operation. If the probe tip is physically attached to the moving member, then cutting chips, particulates, and fluids should not interfere with the ACMM's operation. Ideally, the apparatus would not intrude on the work zone. Also, the device should have a low inertia, so as not to interfere with the rapid motion of the moving member. Such a device should be lightweight, low cost, have low vibrations, have a large range of motion, and a high accuracy. The data collection system of the system should be capable of processing position measurements at a sufficiently high data rate, commensurate with providing real-time feedback to a rapidly moving machine member. The accuracy of such a system should be better than 10 microns, preferably better than 3 microns. Such a system should be easily mounted on, or near, existing machines with minimal structural modifications.

If the probe tip of the ACMM is physically mounted with a pivoting joint to the moving member of the machine tool, the ACMM's probe could be automatically guided by the moving member through all extremes of the workspace. This could make the application of the ACMM simple and automatic; requiring little skill or training. Existing feedback systems, i.e. resolvers, encoders, linear scales, etc. could be used for the servo controls velocity feedback loop, while using the independent position feedback of a pivotally mounted CMM for the displacement feedback loop.

Gantry or bridge-style fixed 3-axis orthogonal (e.g. Cartesian) CMM's provide outstanding accuracy (better than 0.0001 inches), but are typically very expensive and are not portable.

Multi-axis, portable CMM's (ACMM's) are commercially available from Romer, Inc. of Carlsbad, Calif.; and by Faro Technologies, Inc. of Lake Mary, Fla. However, their accuracy is limited to about 0.001–0.005 inches. These portable ACMM's have six degrees-of-freedom (one rotation axis and one swivel axis at each of the three joints, linked by two support arms). Six degrees-of-freedom (DOF's) provides the ability to easily position the probe tip underneath and behind complex shapes, without having to reposition the base. The use of rotary joints also minimizes errors due to torques and bending moments. Precision rotary transducers (e.g. angle encoders) are mounted at each of the six joints. Their data are used to calculate the probe's position in three-dimensional Cartesian space. The measuring volume is generally spherical, with the radius equal to the maximum reach of the linked arms, typically a 3–6 foot radius. The tubular support arms are typically made of a lightweight and stiff material, such as an aluminum alloy, or a carbon fiber composite.

A need exists, therefore, for a low-cost, portable ACMM that has sufficient accuracy for providing in-process inspection of part features while the part is still mounted on the machine (during pauses in the machining cycle). This would eliminate the need to remove the part and transport it to a fixed, large gantry or bridge-style CMM inspection station. Use of an independent, in-process inspection tool can save time, and eliminate potential errors in re-positioning the part when machining starts-up again.

Some machine tools, such as horizontal and vertical lathes, rotate the workpiece during machining. In this case, because the workpiece geometry is axisymmetric, only 2 degrees-of-freedom are required (e.g. travel down the centerline, Z-axis, and radial extension, R-axis). Consequently, a highly accurate ACMM, mounted to, for example, the tail stock frame of a horizontal lathe, and would only need two independent axes of revolution to provide complete measurement for a lathe-type machine tool. A 2 DOF ACMM could also be used for measuring the contour of a part in a flat, 2-D plane (e.g. X-Y plane). An ACMM with only 1 DOF could be used for performance evaluation and calibration of gantry-style 3-axis orthogonal CMM's.

Electro-Discharge Machining (EDM) of metal parts involves passing a high current through a wire or sinker electrode, and spark-eroding the workpiece. Due to the high voltages involved, it would be useful if a highly accurate ACMM could withstand high voltages without damage.

Despite the need for increased accuracy, a highly accurate ACMM should remain a lightweight and portable tool. This allows a single metrology tool to periodically check and certify an entire shop floor having a multitude of equipment. The tool should be easily mounted on a working surface on, or near, existing machines. The tool should be capable of hands-off operation (e.g. unattended), after initial setup.

Many approaches can be used to improve the accuracy of ACMM's to better than 0.001 inches. One method would be to reduce the number of serially linked joints (e.g. from six down to three) because the total position error builds upon the individual position errors for each joint linked in series.

Another method to improve the accuracy of ACMM's would be to increase the accuracy of the angle encoder(s). One approach would be to wrap a linear encoder tape with a fine line pitch (e.g. fine gradation of marks) around the outside circumference of a circular encoder wheel. As the diameter of the wheel increases, so does the circumference. The larger circumference generates a proportionally larger number of counts (e.g. count rate) sensed by a read head for the same angle of rotation, as compared to a wheel having a smaller diameter that is wrapped with an encoder tape having the same line pitch. Likewise, for the same number of line counts, a wheel having a larger diameter will rotate a smaller angle than a wheel having a smaller diameter. Consequently, the angular accuracy can be increased essentially without limit by increasing the diameter of a wheel that has a linear encoder tape wrapped around the wheel's circumference.

Conventional ACMM's have not adopted this approach because the increased weight of the larger diameter encoder wheels reduces the ease of portability, while the increased size could interfere with physical access behind surfaces and inside of small work volumes. Also, it wasn't until recently that flexible, highly accurate optical or inductive encoder tapes became commercially available in a configuration suitable for wrapping around the circumference of a wheel, at an affordable cost.

Accuracy of the ACMM could also be increased by (1) using materials with a low thermal expansion coefficient, (2) requiring very tight machining tolerances, (3) using high precision ball or roller bearings (e.g. ABEC grade 7–9 ball bearings), and (4) using highly accurate angle encoders (e.g. increasing from 81,000 counts per revolution to 230 million counts per revolution). However, these changes generally increase the overall cost of the ACMM.

A need exists, therefore, to reduce the costs of ACMM's, while enhancing accuracy. This can be achieved, in part, by reducing the number of DOF's (e.g. from 6 to 3), which eliminates excess bearings, angle encoders, machining, etc. Also, use of large diameter encoder wheels and wrapped encoder tapes can reduce the costs, as compared to more expensive, commercially available compact laser angle encoders (e.g. Canon K-1 angle encoder).

Reducing the number of DOF's from six to three could eliminate the need to use two hands to support the serially linked arms. This could also eliminate the need for counterbalancing the arms with springs or weights.

Use of a highly accurate articulated coordinate measuring machine (ACMM) mounted on a working surface, on or near, the machine tool or robotic arm, and having a probe tip pivotally-mounted to the movable machine member, could provide independent, real-time position feedback control needed to build Total Process Control (TPC) into the manufacturing process.

Other applications of using a highly accurate articulated coordinate measuring machine include 3-D digitizing/tracing of surfaces and solid objects; 3-D spatial interfacing with a computer (e.g. a 3-D mouse/joystick); 3-D sculpting via a master-slave arrangement; and remote surgery or micro-surgery via a master-slave arrangement.

BRIEF DESCRIPTION OF THE DRAWINGS

FIG. 2 shows a schematic isometric view of a second example of a highly accurate articulated coordinate measuring machine, according to the present invention.

FIG. 24A shows a schematic top view of an example of an articulated coordinate measuring machine, according to the present invention.

FIG. 24B shows a schematic side view of an example of an articulated coordinate measuring machine, according to the present invention.

DETAILED DESCRIPTION OF THE INVENTION

This invention relates generally to the field of precision machining, and more specifically to a system and method for providing independent, real-time position feedback control during precision machining. This invention also relates to an articulated coordinate measuring machine (ACMM). The ACMM is kinematically mounted to a working surface (e.g. worktable or frame). The ACMM's probe tip can be physically attached to a movable machine member (e.g. a machine tool holder, or end effector of a robotic arm) to provide independent, real-time measurement of the member's position in one, two, or three-dimensional Cartesian space. The true measured position (e.g. true position) can then be compared, in real-time, to the desired position to create a position error signal that is useful for evaluating the performance of the movable machine, or for providing closed-loop position feedback control. An ACMM with three degrees-of-freedom can be described as a 3D Ball Bar™.

Figure 1A:
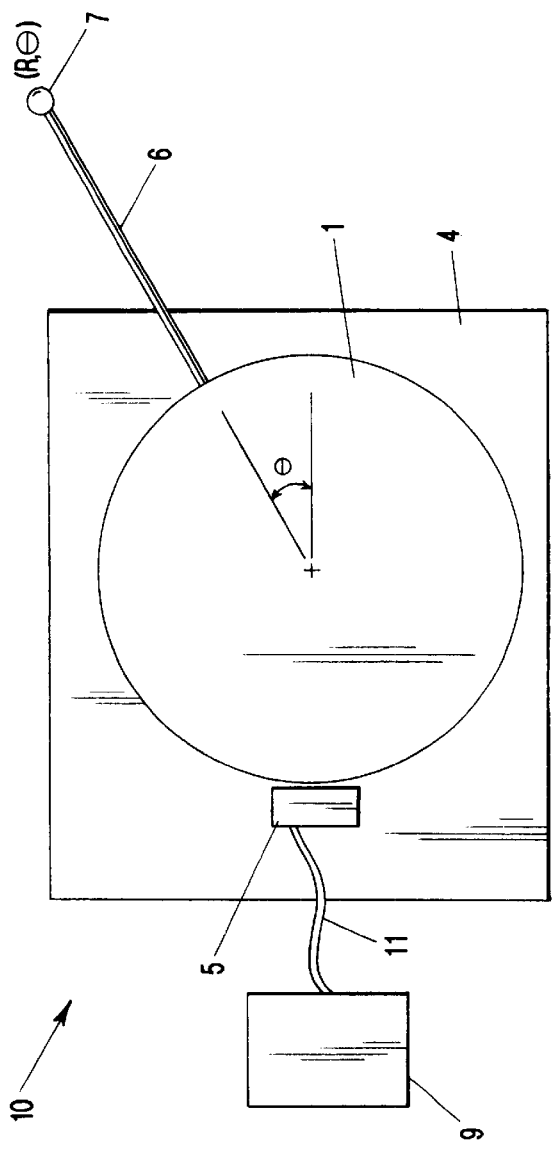
FIG. 1A shows a schematic top view of a first example an articulated coordinate measuring machine having a single degree of freedom, according to the present invention.
Figure 1B:
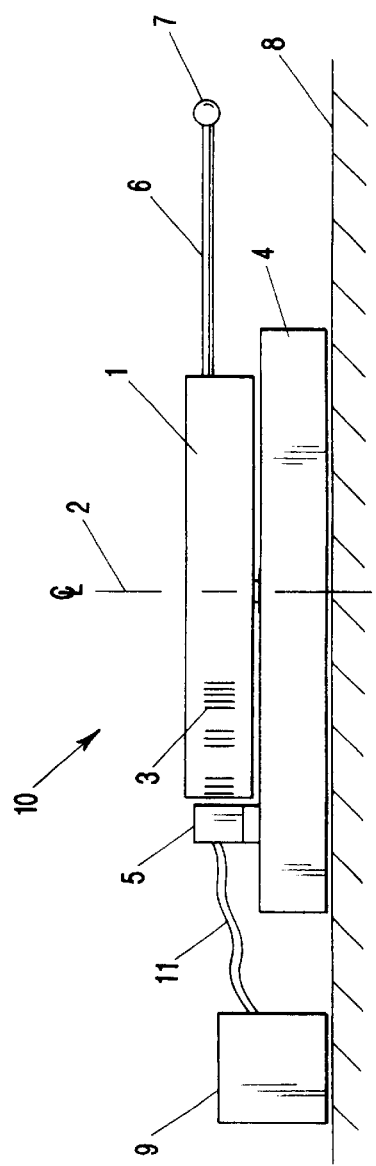
FIG. 1B shows a schematic side view of a first example of an articulated coordinate measuring machine having a single degree of freedom, according to the present invention.

FIGS. 1A and 1B show a schematic top view and side view, respectively, of a first example of an articulated coordinate measuring machine (ACMM) 10 having at least a single degree of freedom, according to the present invention. ACMM 10 comprises a circular encoder wheel 1, having an axis of rotation 2. A plurality of marks 3 are disposed around at least a portion of the circumference of the encoder wheel 1. The marks can be lines, circles, oval, or other shapes. The marks can be uniformly or non-uniformly spaced apart. The lines can be spaced 20 microns apart. Non-uniformly spaced marks can provide the ability to determine the absolute angular position. The plurality of marks 3 can be ruled directly onto the surface of the circumference of encoder wheel 1. Ruling of marks can include precision machining or scratching of lines, deposition of lines via micro-lithographic techniques, or the creation of pits via laser beam ablation. ACMM 10 further comprises bearing means 4 for supporting encoder wheel 1 while permitting free rotation of wheel 1 about axis of rotation 2. Bearing means 4 can be an air bearing, providing essentially frictionless support. Alternatively, bearing means 4 can include roller or ball bearings. A sensor 5 is rigidly attached to bearing means 4, and is used for detecting the motion of at least some of the marks 3 as the encoder wheel 1 rotates. Sensor 5 can comprise an optical detector, inductive detector, or magnetic detector. ACMM 10 further comprises a probe arm 6, having a proximal end rigidly attached to encoder wheel 1, and having a distal end with a probe tip 7 attached thereto. ACMM 10 further comprises a means (not shown) for kinematically constraining ACMM 10 to a working surface 8. ACMM 10 further comprises coordinate processing means 9, operatively connected to sensor 5, for converting the output of sensor 5 into a set of cylindrical coordinates representing the position of probe tip 7 relative to a reference cylindrical coordinate system (not shown). The set of cylindrical coordinates can represent the incremental position of probe tip 7, relative to a previously known position. Processing means 9 can be connected to sensor 5 with cable 11. Wireless communication means (not shown) can also be used to transmit information from sensor 5 to processing means 9. Processing means 9 can comprise a microprocessor with memory storage. Processing means 9 can comprise means for converting the cylindrical coordinates into Cartesian (e.g. X,Y) coordinates.

Figure 1C:
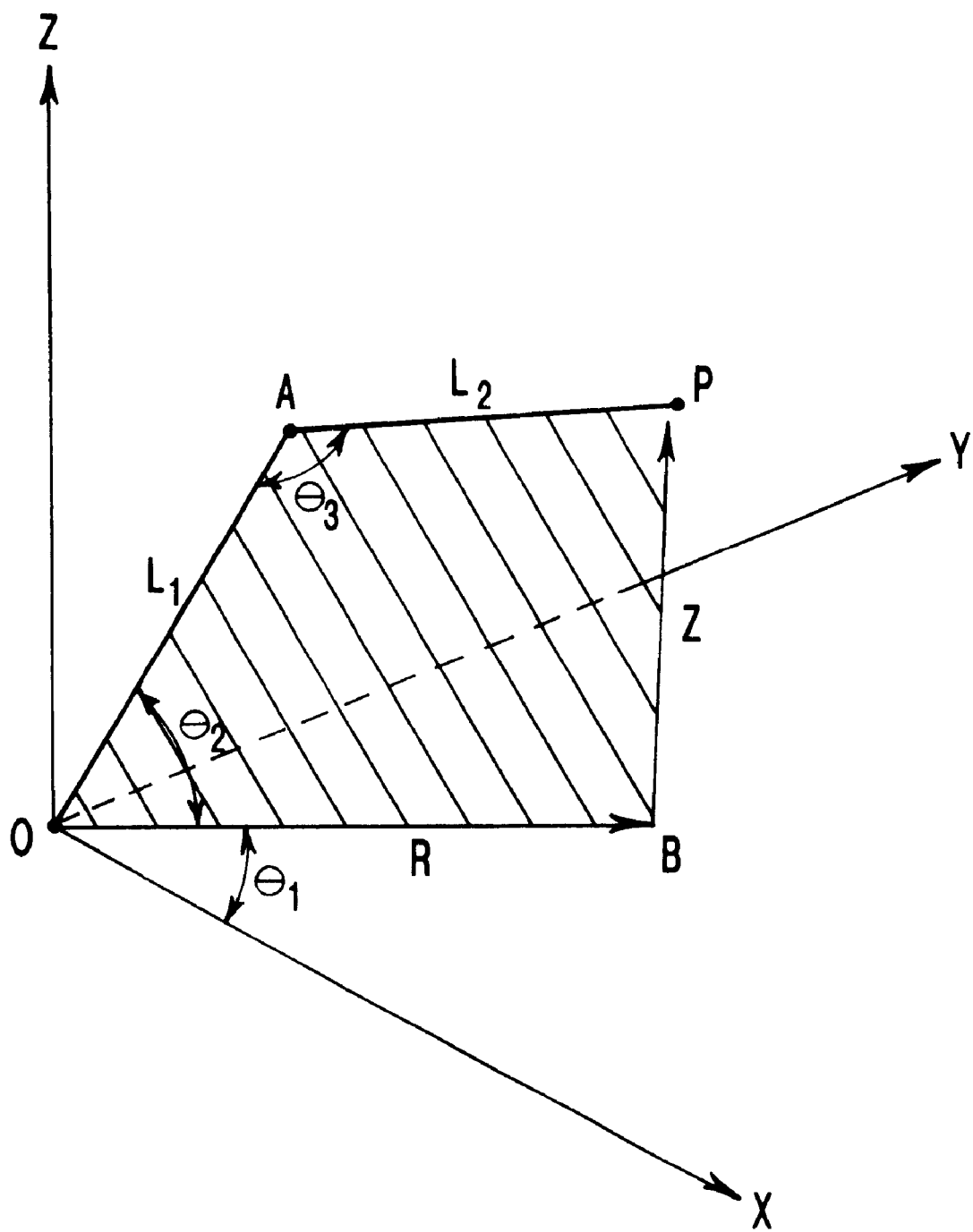
FIG. 1C shows the geometric relationships between the two serially-linked arms, the three angles of revolution, and the probe point "P", according to the present invention.

ACMM 10 can comprise three serially-linked revolute joints, each having a respective angle of revolution. FIG. 1C shows the geometric relationships between two serially-linked arms, three angles of revolution, and the probe point P according to the present invention. The two serially-linked arms have a length equal to $L_1$ and $L_2$, respectively. The coordinates of probe point P, relative to the origin, correspond to $(R, \theta, Z)$ in cylindrical coordinates. The same point P can also be described by the three angles of revolution, $\theta_1$, $\theta_2$, and $\theta_3$; combined with the two fixed link lengths, $L_1$ and $L_2$. The axis of rotation for the first angle $\theta$ coincides with the Z-axis. The axis of rotation for the second angle, $\theta_2$, passes through point "O", is oriented perpendicular to the plane containing the points (O, A, P, B). The axis of rotation for the third angle, $\theta_3$, passes through point "A", and is oriented parallel to the axis of rotation for the second angle, $\theta_2$, (as defined above). It is well known to those skilled in the art that any combination of the three independent angles of rotation, $\theta_1$, $\theta_2$, and $\theta_3$, combined with the two fixed link lengths, $L_1$ and $L_2$, can be translated by appropriate coordinate transformation matrices into cylindrical coordinates $(R, \theta, Z)$, and from there to Cartesian coordinates $(X, Y, Z)$ for point P. Likewise, incremental changes in the three rotation angles, $\Delta\theta_1$, $\Delta\theta_2$, and $\Delta\theta_3$, can be readily transformed into incremental changes in the Cartesian coordinates $(\Delta X, \Delta Y, \Delta Z)$, as the probe point moves from its original point P to a new point P'(not shown).

FIG. 2 shows a schematic isometric view of a second example of a highly accurate articulated coordinate measuring machine (ACMM) 10, according to the present invention. ACMM 10 comprises a support base 12, adapted to be rigidly fixed to a working surface (e.g. worktable or frame) 100, that the three-dimensional spatial coordinates of the probe tip 30 can be measured relative to. Alternatively, base 12 can be adapted to be fixed relative to working surface 100 (e.g. on a tripod or rigid stand, not shown). FIG. 2 illustrates that the dimensions of a machined part 102 can be measured or probed by "touching" the surface of part 102 with probe tip 30. Here, the word touching" broadly contemplates the use of non-contact probe tips, such as laser-probes and electrostatic probes. Not shown in FIG. 2 are means for converting the measured angles of rotation ($\theta_1$, $\theta_2$, $\theta_3$) into Cartesian coordinates X, Y, and Z. ACMM 10 can be used to evaluate and calibrate a 6-axis portable CMM, such as commercially manufactured by Romer, Inc. of Carlsbad, Calif.; and by Faro Technologies, Inc. of Lake Mary, Fla.). Alternatively, part 102 can be a precision, certified metrology artifact (e.g. gauge sphere, bar, square, or cube). In this case, the accuracy of ACMM 10 can be evaluated and calibrated by measuring a certified artifact 102 with ACMM 10. Probe tip 30 can be a precision gauge ball, or other probe tip geometry, as needed.

Referring to FIG. 2, ACMM 10 comprises a first revolute joint 24, rigidly attached to the distal end of first support arm 22. In FIG. 2, first support arm 22 is illustrated as a pair of parallel tubes. First joint 24 has a first axis of revolution 26, which can be oriented substantially parallel to second axis 20. First axis 26 can be oriented substantially perpendicular to the longitudinal axis of lower support arm 22. ACMM 10 further includes a rigid probe arm 28, having a proximal end rigidly connected to the first joint 24. Probe arm 28 has a longitudinal axis aligned substantially perpendicular to third axis 26. Therefore, the plane in which probe arm 28 rotates is substantially parallel to the plane in which the first support arm 22 rotates.

Referring still to FIG. 2, ACMM 10 comprises a third revolute joint 14 that is rotatably mounted to base 12. Third joint 14 has a third axis of revolution 16, which is oriented substantially perpendicular to the broad plane of base 12. In the example shown in FIG. 2, third axis 16 is nominally oriented vertically (as in a turntable). ACMM 10 further includes a second revolute joint 18, rotatably mounted to the third joint 14. Second joint 18 has a second axis of revolution 20 that is oriented substantially perpendicular to, and intersecting with, the third axis of revolution 16. ACMM 10 includes a rigid first support arm 22, having a proximal end rigidly connected to second joint 18. First support arm 22 has a longitudinal axis aligned substantially perpendicular to second axis 20. Second support arm 23 has a distal end rigidly attached to second joint 18, and has a proximal end rigidly attached to third joint 14.

ACMM 10 further includes a probe tip 30, attached to the distal end of the probe arm 28. Probe tip 30 can be a precision gauge ball. However, other probe tip geometries, well-known to those skilled in the art, can be used in place of a gauge sphere (e.g. single touch probe, multiple touch probes, trigger probes, contact probe, constant-force touch probes, or non-contacting electrostatic or laser probes). Probe tip 30 can include an assembly having a coaxial set of bearings for mounting to a rotating tool (e.g. drill bit, milling tool); thereby permitting coordinate measurements while the spindle is rotating. ACMM 10 further includes means (not shown) for measuring the rotation angles $\theta_1$, $\theta_2$, and $\theta_3$ of the three revolute joints 14, 18, and 24, respectively. Details of the means for measuring the rotation angles will be provided later. Base 12 can have three spherical ball mounts 32 rigidly attached to the bottom of base 12. Mounts 32 can be arranged approximately 120 degrees apart.

Figure 3:
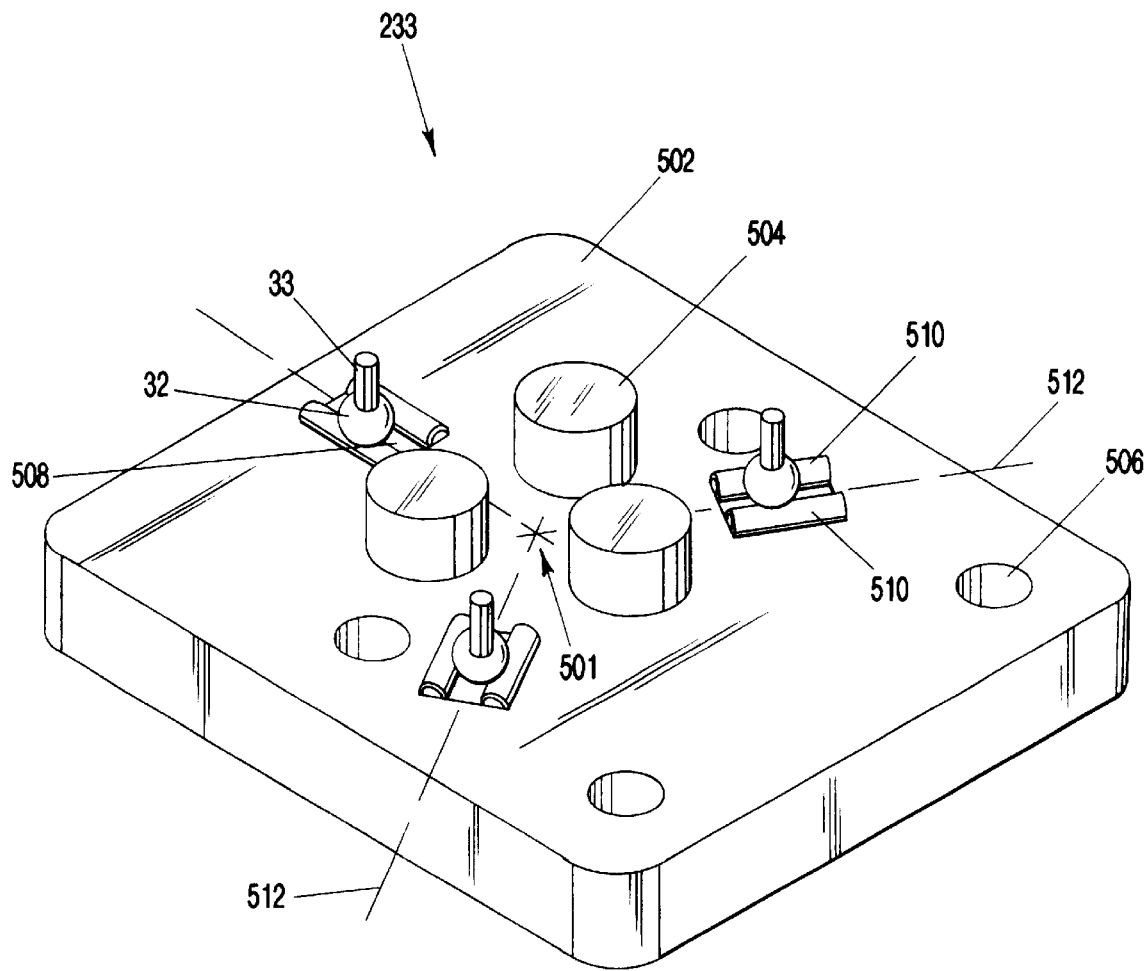
FIG. 3 shows a first example of a magnetic kinematic mount for holding the base, according to the present invention.
Figure 12:
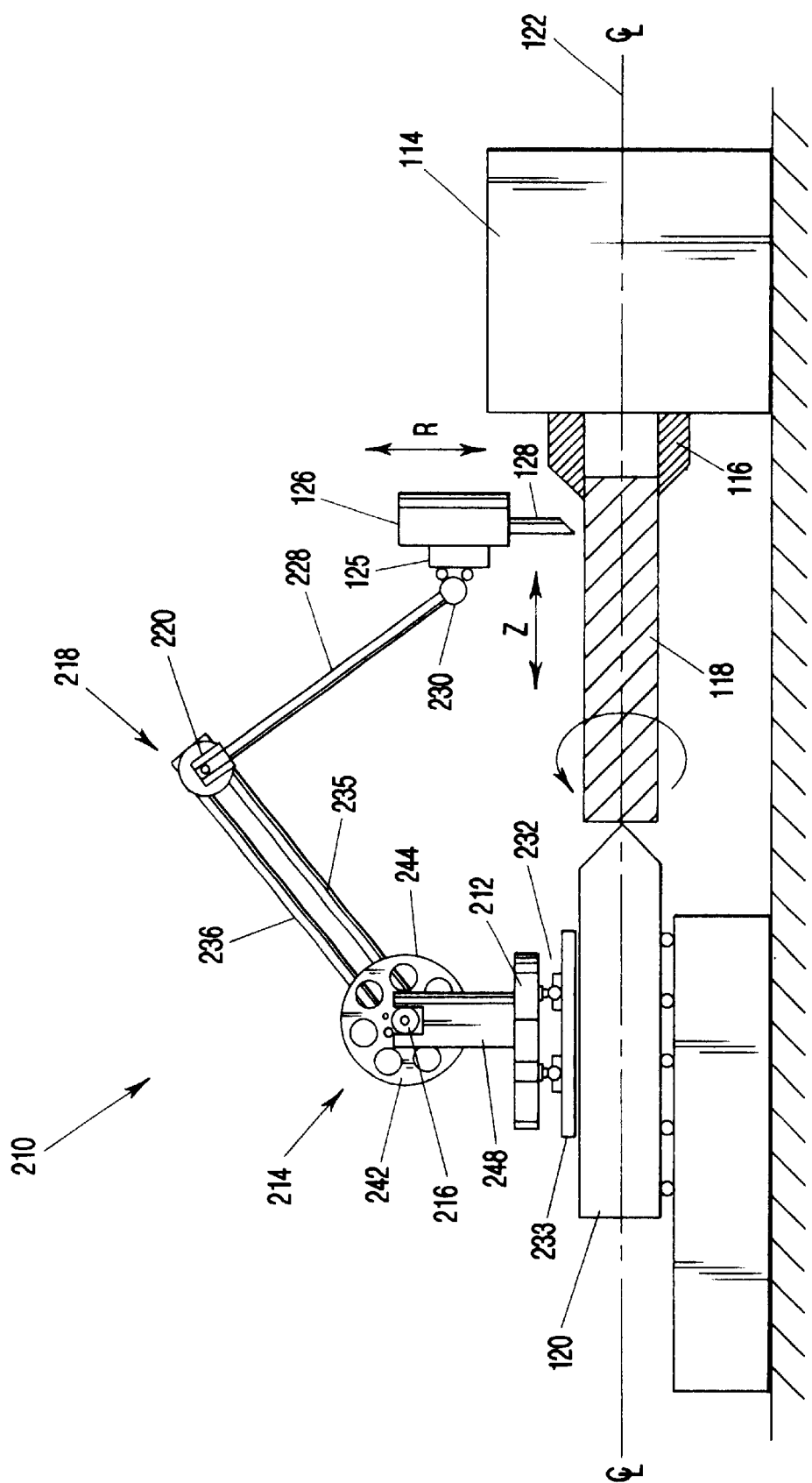
FIG. 12 shows a schematic isometric view of a sixth example of a highly accurate two-axis articulated coordinate measuring machine, attached to a horizontal CNC lathe for providing position feedback control, or for calibration purposes, according to the present invention.

FIG. 3 shows a first example of a magnetic kinematic mount 233 for rigidly holding base 12 (not shown) to a working surface, such as surface 100 in FIG. 2, or to tailstock 120 in FIG. 12, according to the present invention. Kinematic mount 233 can include a rigid plate 502, with three magnets 504 rigidly attached to plate 502, preferably arranged approximately 120 degrees apart, around a central point 501 defined by the intersection of three axes 512. Magnets 504 provide the force for holding down base 12 to plate 502. Other well-known methods of attaching base 12 can be used, such as clamping, vacuum mounting, etc. Additionally, a spring (not shown) can be attached to the bottom of base 12 at one end, and to the plate 502 at the other end, to provide additional holding force. Plate 502 can be rigidly attached to surface 100 (or tailstock 120) via bolts engaged through a plurality of mounting holes 506.

Referring still to FIG. 3, mounting feet 32 with stem 33 can be disposed in approximately 120 degrees apart, about central point 501, in-line with axes 512 (e.g. approximately rotated 60 degrees from magnets 504). Each mounting foot 32 contacts a pair of cylinders 510, thereby providing a two-point contact. Pair of cylinders 510 is rigidly attached to plate 502, and rest partially inside of rectangular recess 508 inside of plate 502. The axes of cylinders 502 are approximately parallel to axes 512. Alternatively, the pair of cylinders 510 could be replaced with a V-shaped block (not shown) having a similar orientation. The above-described alignment of pair of cylinders 510 provides a highly accurate, low-friction, kinematic mounting geometry for constraining all six degrees of freedom of base 12. Pair of cylinders 510 can be potted in epoxy, preferably while mounting feet 32 are pressing down on cylinders 510 during hardening of the epoxy. This arrangement can provide a highly accurate, and highly repeatable matched set of mounts.

Figure 4:
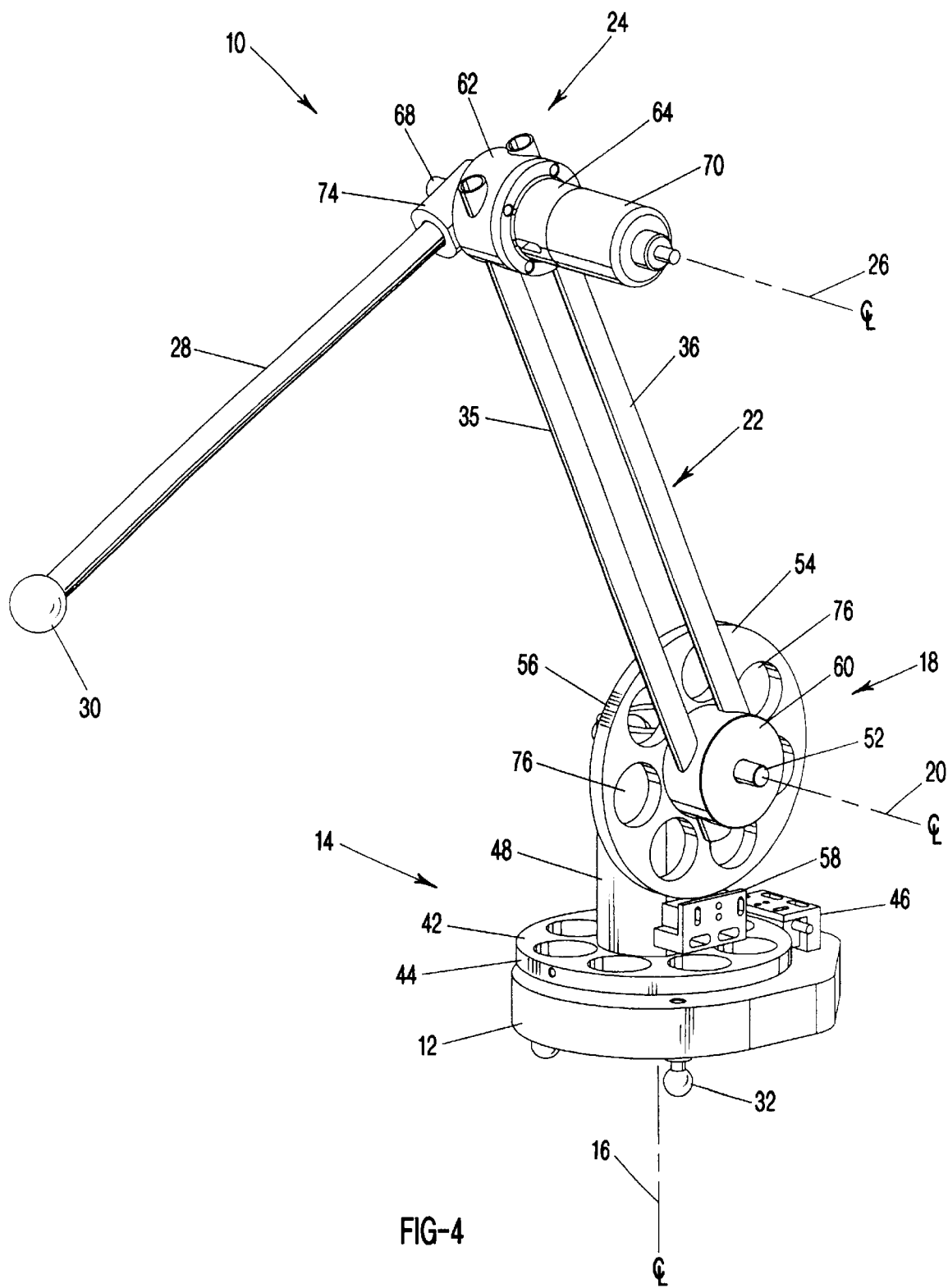
FIG. 4 shows a schematic isometric view of a third example of a highly accurate articulated coordinate measuring machine, according to the present invention.
Figure 5A:
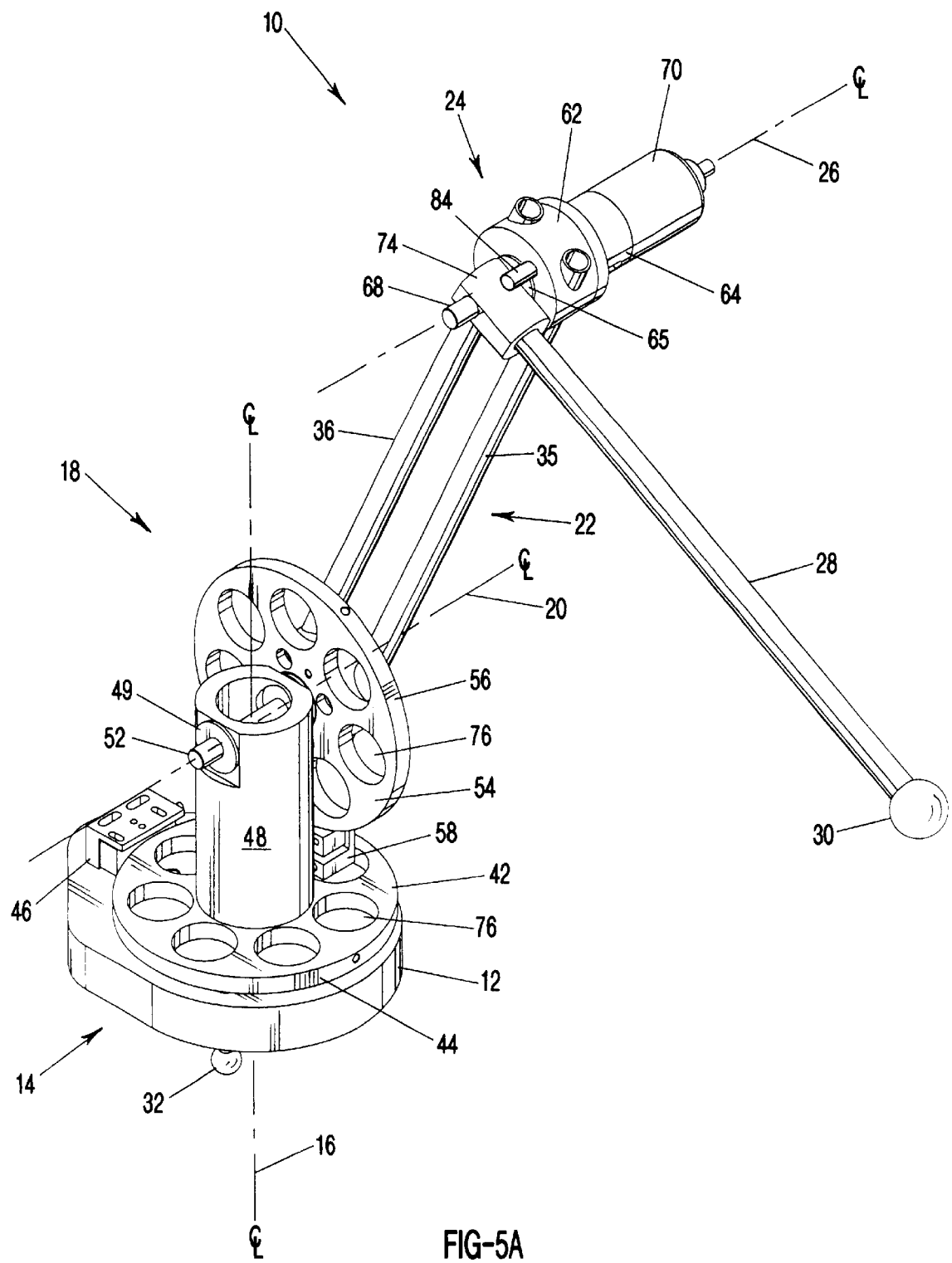
FIG. 5a shows a schematic isometric view of a third example of a highly accurate articulated coordinate measuring machine, according to the present invention.
Figure 5B:
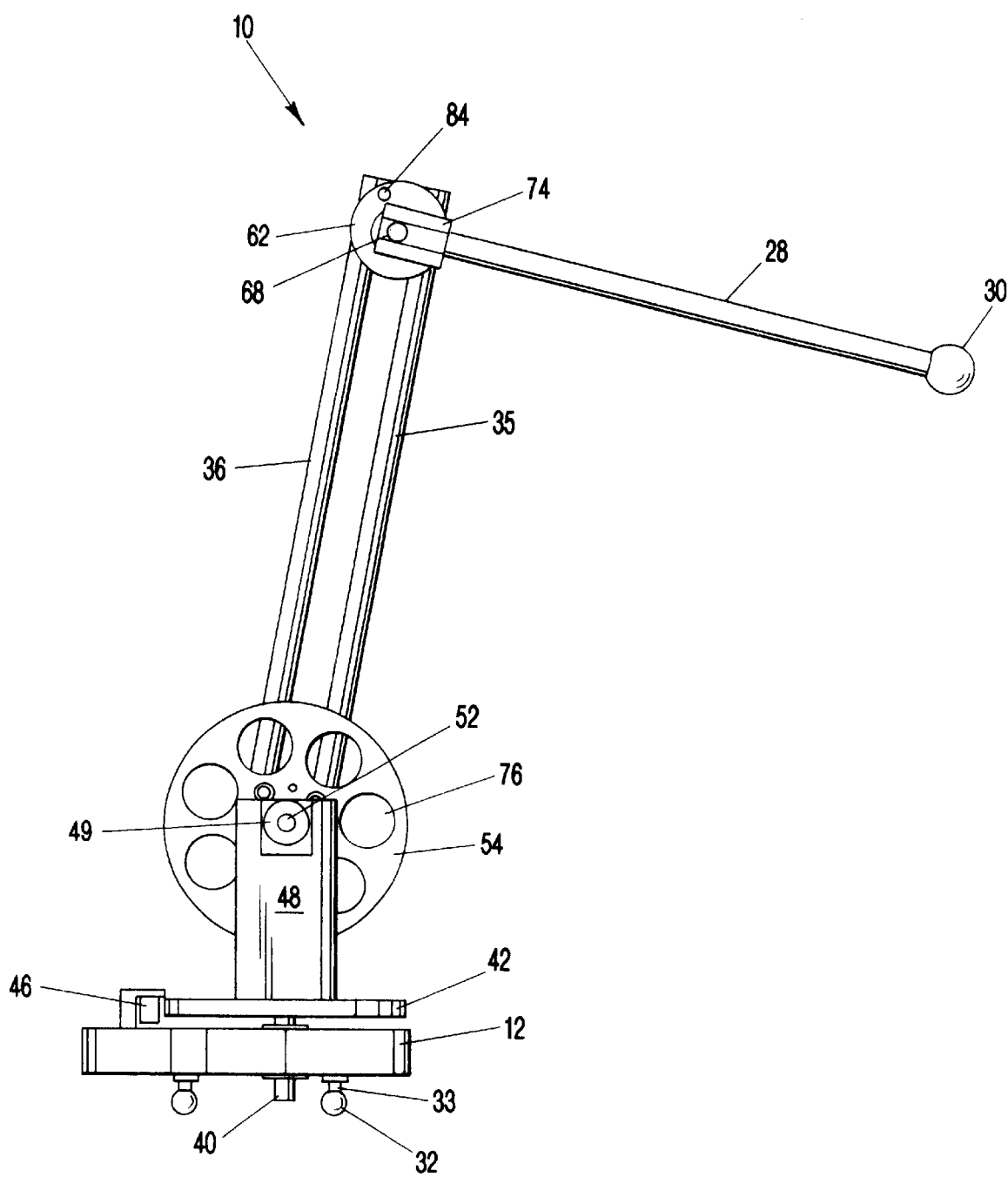
FIG. 5b shows a schematic side view of a third example of a highly accurate articulated coordinate measuring machine, according to the present invention.
Figure 5C:
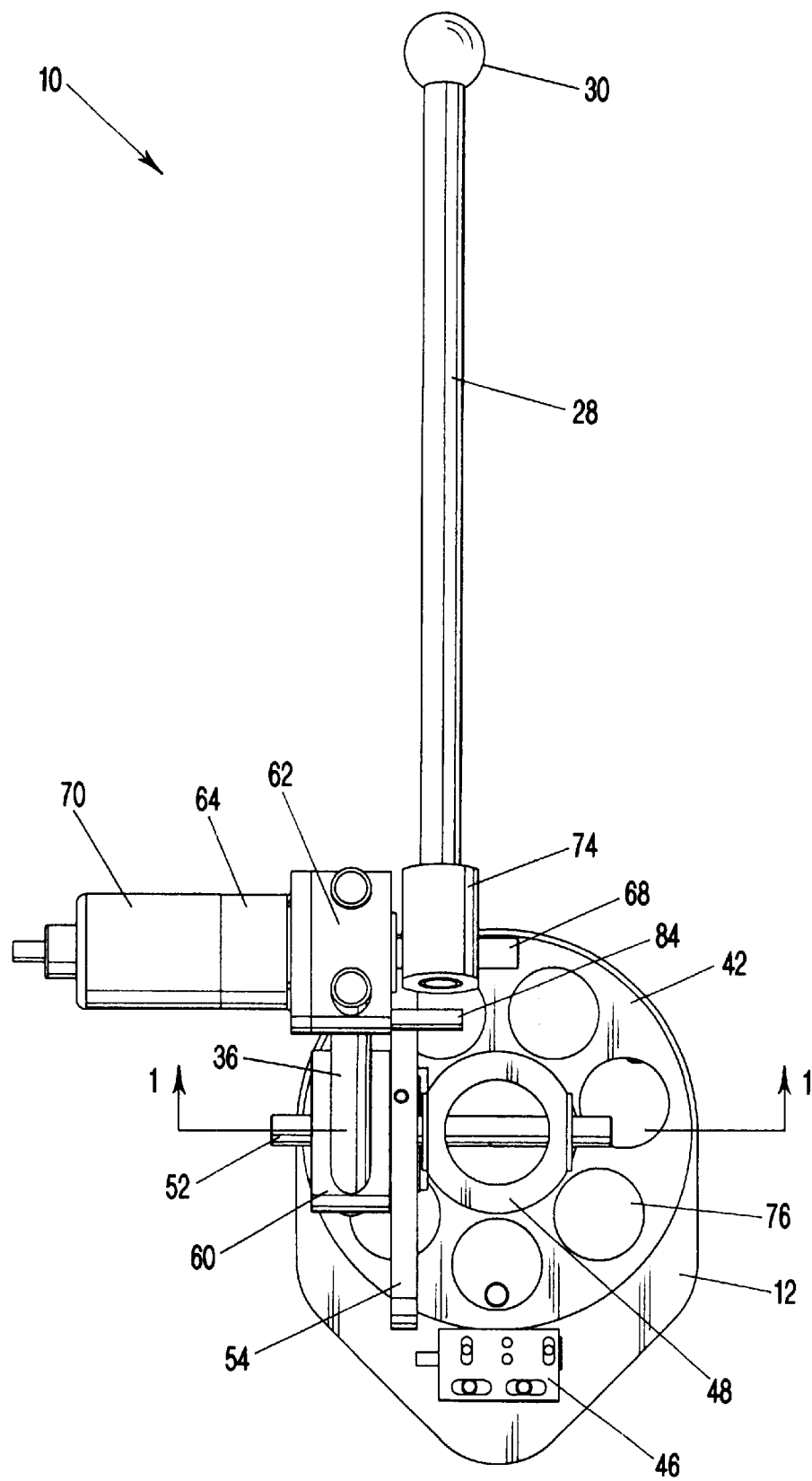
FIG. 5c shows a schematic top view of a third example of a highly accurate articulated coordinate measuring machine, according to the present invention.
Figure 5D:
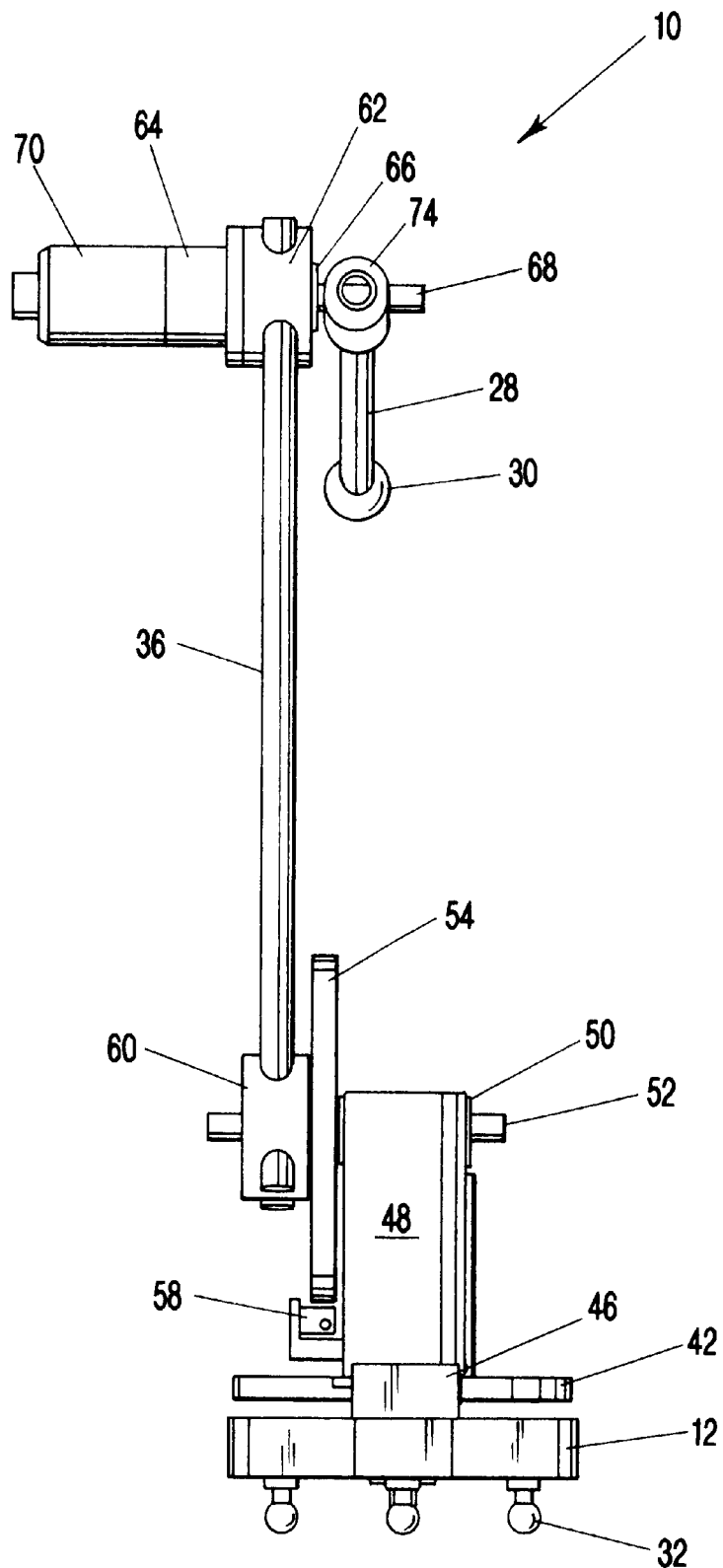
FIG. 5d shows a schematic backside view of a third example of a highly accurate articulated coordinate measuring machine, according to the present invention.
Figure 6:
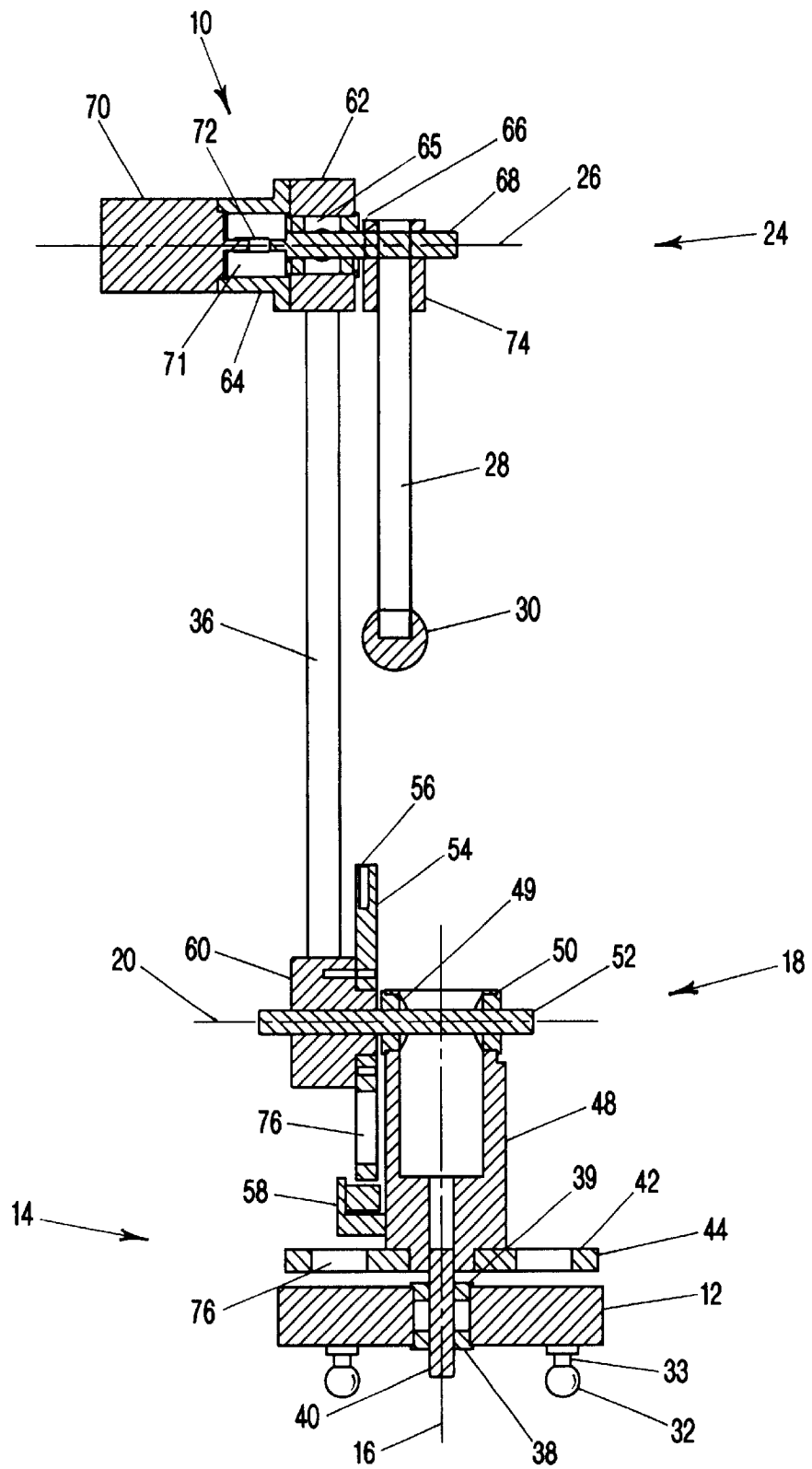
FIG. 6 shows a schematic cross-section view of a third example of a highly accurate articulated coordinate measuring machine, according to the present invention.

Referring to FIGS. 4, 5a, 5b, 5c, 5d, and 6, a third example of a highly accurate articulated coordinate measuring machine (ACMM) 10, according to the present invention is described. FIGS. 4 and 5a shows two different schematic isometric views. FIG. 5b shows a side view. FIG. 5c shows a top view. FIG. 5d shows a backside view. FIG. 6 shows a vertical cross-section view through Sec. 1—1. ACMM 10 can include (in addition to the elements described above in FIG. 2) a first pair of bearing assemblies 38 and 39, rigidly mounted in base 12. Bearing assemblies 38 and 39 can be ball bearings or roller bearings. A first shaft 40 can be rigidly mounted inside the first pair of ball bearing assemblies 38 and 39, with first shaft 40 having a centerline aligned coaxially with the third axis of revolution 16. ACMM 10 can include a first circular wheel 42, having an axis aligned coaxially with the third axis of revolution 16, and rigidly mounted to the first shaft 40.

Means for measuring the angle of rotation $\theta_1$ of the third joint 14 about third axis 16 can include a first encoder tape 44, which can be wrapped around the circumference of, and rigidly attached to, the first circular wheel 42. A first sensor 46 can be rigidly mounted to the upper surface of base 12, with sensor 46 located in close proximity to the first encoder tape 44, for accurately measuring the rotation angle $\theta_1$ of the first circular wheel 42. Wheel 42 can have a diameter greater than 4.8 inches to enable high angular accuracy. Wheel 42 can have a diameter of 4.851 inches, and can be wrapped with a Renishaw tape scale 44 having 0.1 micron effective resolution, thereby providing an angular resolution of three counts/arcsecond. Multiple sensors, similar to sensor 46, can be mounted at a plurality of circumferential locations (not shown) surrounding wheel 42 to provide increased accuracy and capability for interpolation.

Referring still to FIGS. 4, 5a, 5b, 5c, 5d, and 6, ACMM 10 can further include a first riser 48, rigidly attached to the first circular wheel 42, having a centerline aligned coaxially with the first axis of revolution 16. First riser 48 functions as the second support arm 23 shown in FIG. 2. A second pair of ball bearing assemblies 49 and 50 can be rigidly mounted in the first riser 48. A second shaft 52 can be rigidly mounted inside the second pair of ball bearing assemblies 49 and 50, having a centerline aligned coaxially with the second axis of revolution 20. A second circular wheel 54, having an axis aligned coaxially with the second axis 20, can be rigidly mounted to the second shaft 52. Means for measuring the angle of rotation $\theta_2$ of the second joint 18 about second axis 20 can include a second encoder tape 56, which can be wrapped around the circumference of, and rigidly attached to, the second circular wheel 54. A second sensor 58 can be rigidly mounted to the outside of the first riser 48, and located in close proximity to second encoder tape 56, for accurately measuring the rotation angle $\theta_2$ of the second circular wheel 54.

ACMM 10 can further include a second riser 60, rigidly attached to the second circular wheel 54, having a centerline aligned coaxially with the second axis of revolution 20; and rigidly attached to the lower support arm 22. First support arm 22 can include a pair of parallel tubes 35 and 36, spaced an appropriate distance apart. The combination of tubes 35 and 36 can provide a larger bending moment of inertia to resist bending moments than a single tube placed along the centerline between the second joint 18 and the first joint 24. Encoder tapes 44 and 56 can be a flexible tape scale having lines ruled 20 microns apart, having 0.1 micron effective resolution, such as made by Renishaw, Inc. Encoder tapes 44 and 56 and sensors 46 and 58 can be inductive, magnetic, or optical.

Referring still to FIGS. 4, 5a, 5b, 5c, 5d, and 6, ACMM 10 can further include a bearing body 62, rigidly attached to the distal end of the first support arm 22 (or, alternatively, tubes 35 and 36). A third riser 64 can be rigidly attached to the bearing body 62, having a centerline aligned coaxially with the first axis of revolution 26. A third pair of ball bearing assemblies 65 and 66 can be rigidly mounted in the bearing body 62. A third shaft 68 can be rigidly mounted inside the third pair of ball bearing assemblies 65 and 66, having a centerline aligned coaxially with the first axis 26. ACMM 10 can further include an angle encoder 70, which is rigidly attached to the third riser 64, and can have an encoder shaft 71 flexibly and rotatably attached to the third shaft 68 via a flexible coupling 72. A probe arm connector 74 can be rigidly attached to the third shaft 68, and rigidly attached to the proximal end of the probe arm 28. Angle encoder 70 can be a compact and lightweight laser optical angle encoder, such as a Model K-1 manufactured by Canon, Inc, which has a resolution of 81,000 counts/revolution, a small diameter (1.5 inches) and a light weight (80 grams). Using an 80X interpolator, the Canon K-1 can provide an angular resolution of 5 counts/arc-second.

Experiments were performed to compare the resolution and repeatability of two angle encoder units. A Zeiss RT-5 rotary table was used as the reference device, which has a certified accuracy of 1 arc-second). One encoder was the Canon Model K-1 laser angle encoder, as described above. The other consisted of a Renishaw 0.1 micron flexible tape scale (e.g. encoder tape) wound around the large diameter circular wheel (approx. 11.3 inches diameter) of the Zeiss rotary table. In this experimental configuration, the combination of encoder tape scale and large circular wheel produced a resolution of 7 counts/arc-second. This resolution better than the resolution of the Canon K-1 laser angle encoder (5 counts/arc-second), with a fraction of the cost of the laser angle encoder. With proper calibration, the combination of encoder tape and large circular wheel is expected to exhibit an accuracy of about 2 arc-seconds, which is better accuracy than the Canon K-1 encoder is. Additional experiments showed that the combination of encoder tape and large circular wheel provided a repeatability that was ten times more repeatable than the Canon K-1 encoder.

Circular wheels 42 and 54 can include a plurality of weight-reducing penetrations 76 (not shown in FIG. 6), such as through-holes, for reducing the total weight of ACMM 10. The location, size, and number of penetrations 76 should be chosen as to not dramatically reduce the stiffness of the circular wheel. Circular wheels 42 and 54 can have a diameter greater than 4.5 inches. Circular wheels 42 and 54 can have a diameter equal to 4.851 inches, +/−0.001 inches. Circular wheels 42 and 54 can have a roundness, concentricity, and parallelism machining tolerance equal to 0.0005 inches. Circular wheels 42 and 54 can have central through-hole for accepting a round shaft, wherein the hole's diameter has a machining tolerance equal to +0.000 or −0.0002 inches. The final grinding or lapping performed on the wheel's circumference, and the drilling of the shaft borehole for each joint are preferably completed in the after the wheel and riser have been pre-assembled into a rigid subassembly. This method of fabrication minimizes form error and radial error motion of the wheel relative to the joint axis centerline.

With respect to FIGS. 4, 5a, 5b, 5c, and 5d, it will be appreciated by those skilled in the art that the majority of the mass and weight of the ACMM 10 can be placed as close as possible to base 12. Also, the two arms 22 and 28, and third revolute joint 24, have been designed to be as lightweight as possible. This design philosophy helps to minimize errors due to distortion that could adversely affect the overall accuracy of ACMM 10.

For some applications, it may be undesirable for the ACMM 10 to fully extend both arms 22 and 28. For this reason, end stop pin 84 can protrude from the side of the bearing body 62, to physically prevent excessive rotation of probe arm 28 beyond about 170 degrees. End stop pin 84 can be removable. Means other than pin 84 can be used for stopping excess rotation, such as an integral protrusion (e.g. a tab) of material from bearing body 62.

Referring still to FIGS. 4, 5a, 5b, 5c, 5d, and 6, the lengths of the first support arm 22 and the probe arm 28 can be approximately the same. Both lengths can be about twelve inches long. Arms 22 and 28 preferably can be made of a stiff material having a low thermal expansion coefficient and a high elastic modulus. The stiff material can be an alumina ceramic material, or other structural ceramics (e.g. silicon carbide, silicon nitride, zirconia, partially-stabilized zirconia). Alternatively, a woven carbon-fiber or boron-fiber reinforced composite material can be used. An epoxy-based matrix can be used. Arms 22 and 28 can comprise a hollow, thin-walled tube, made of a carbon-fiber reinforced composite material with a carbon-matrix (e.g. carbon/carbon composite or carbon fiber composite). Such a material provides high stiffness, low density, and essentially zero coefficient of thermal expansion (CTE). Arms 22 and 28 can be rigidly attached to the revolute joints by an adhesive such as epoxy, or by other means well-known in the art (e.g. brazing, soldering, mechanical attachment). The work volume of ACMM 10 in this example is about a 1.2 meter diameter sphere.

For the application where ACMM 10 is used for performing metrology of an Electro Discharge Machining (EDM) operation, the use of electrically insulating materials for arms 22 and 28 is preferred. Alumina is one example of a desirable material having a high resistance to high voltage breakdown. Fiber-reinforced epoxy-matrix composites could also provide high electrical resistance.

Referring still to Figs. FIGS. 4, 5a, 5b, 5c, 5d, and 6, the first, second, and third pairs of bearing assemblies preferably are precision bearings (e.g. ball or roller), to minimize friction forces, torques, and kinematic errors. These bearings can be ABEC grade 7, 8 or 9 ball bearings. The structural elements of ACMM 10 are preferably made of a metallic alloy with high stability and a very low coefficient of thermal expansion. Metal alloys such as INVAR-36, SUPER INVAR, and KOVAR are representative of this class of materials having essentially zero CTE, high elastic modulus, and high yield strength. These materials can be precision machined to high tolerances by grinding, etc. Use of materials having essentially zero or low CTE in ACMM 10 is highly desirable to minimize thermal distortion errors due to temperature differences, therefore improving measuring accuracy in an uncontrolled thermal environment.

Figure 7:
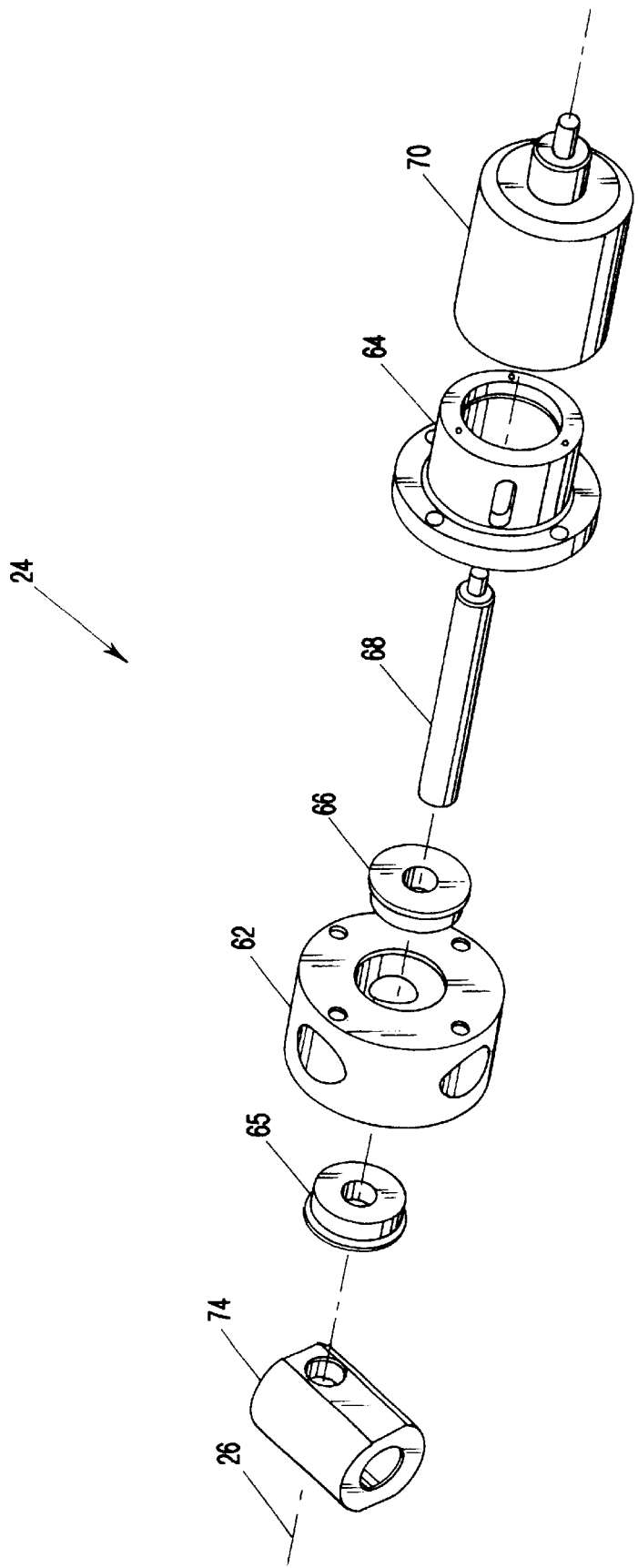
FIG. 7 shows a schematic isometric exploded view of a second example of the third revolute joint of the third example of a highly accurate articulated coordinate measuring machine, according to the present invention.

FIG. 7 shows a schematic isometric exploded view of a second example of the first revolute joint 24 of the third example a highly accurate articulated coordinate measuring machine, according to the present invention.

Metal-to-metal concentric joints can be assembled by using an interference-type thermal shrink-fit process. Examples include assembling ball bearing assemblies 38 and 39 into base 12 by cooling the assemblies to −50 C prior to insertion. Upon heating to room temperature, expansion of the ball bearing assembly outer radius creates an tight and highly rigid interference fit. Another example is shrink-fit assembly of shaft 40 into ball bearing assemblies 38 and 39.

Figure 8:
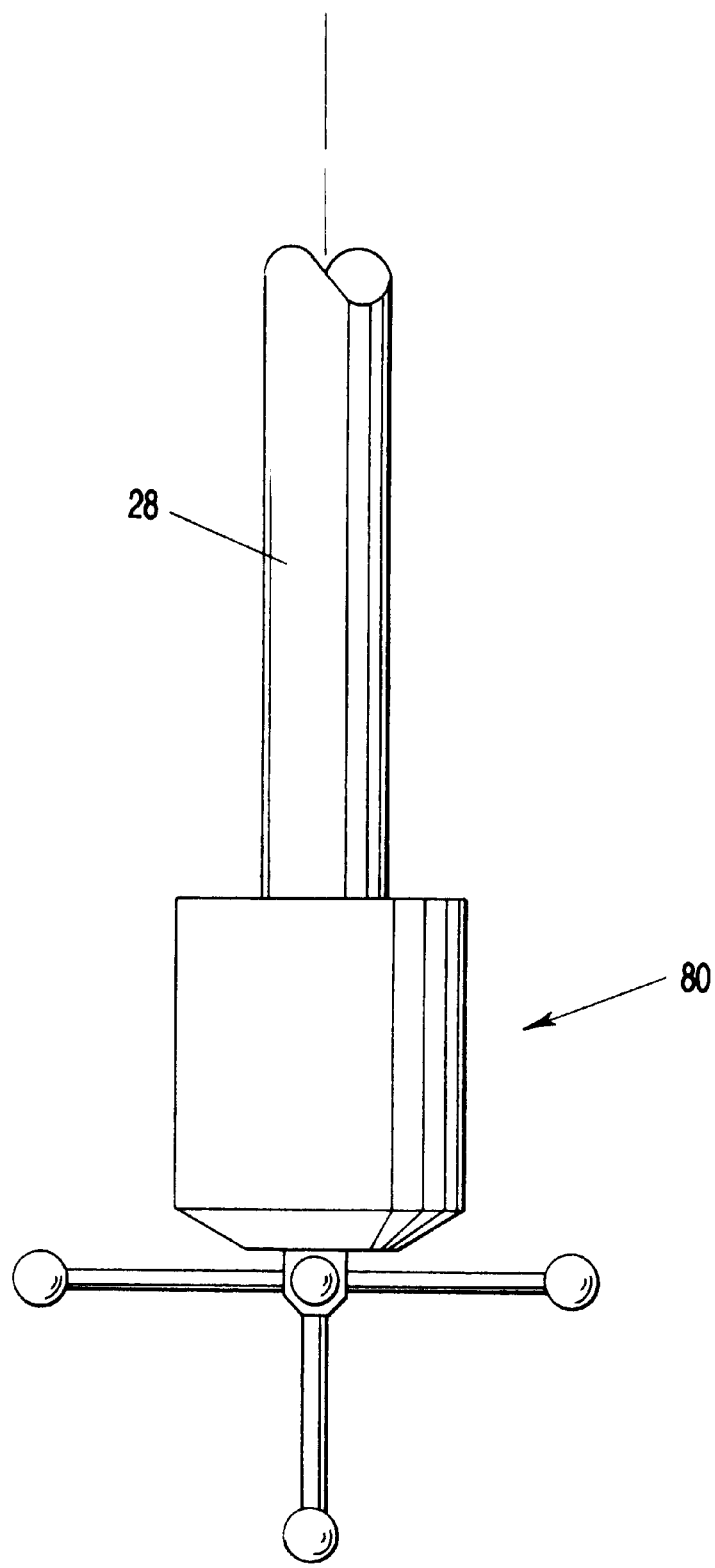
FIG. 8 shows a schematic view of a first example of probe tip body having multiple touch probes, according to the present invention.

FIG. 8 shows a schematic view of a first example of probe tip body 80 having multiple touch probes, according to the present invention. Multiple touch probe tips can be used to gain access behind surfaces that would be inaccessible with a single probe tip, such as a ball or single hard probe.

Figure 9:
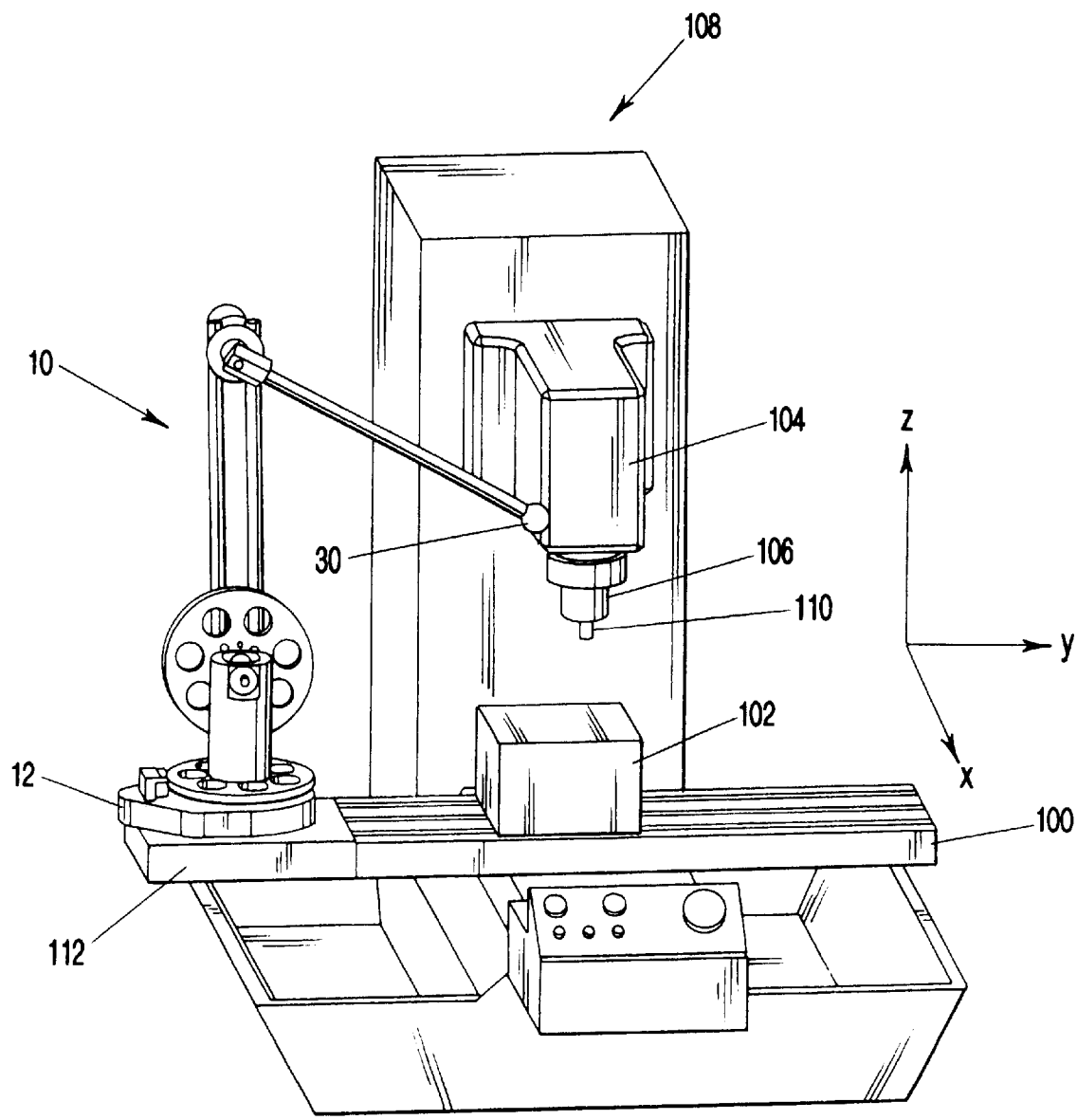
FIG. 9 shows a schematic isometric view of a fourth example of a highly accurate articulated coordinate measuring machine, attached to a 3-axis CNC milling machine for providing position feedback control, or for calibration purposes, according to the present invention.

FIG. 9 shows a schematic isometric view of a fourth example of a highly accurate articulated coordinate measuring machine 10, coupled to a 3-axis CNC milling machine 108 for providing 3-D position feedback control, or for calibration purposes, according to the present invention. In this example, machine 108 has a head 104 that houses the rotating spindle 106 and cutting tool 110. Head 104 moves up and down along the vertical Z-axis. Workpiece 102 is attached to a moving stage 100, which can move in the X and Y-axis directions. Spherical probe tip 30 can be coupled to head 104 using a three-point pivot mount (not shown), which provides a low-friction, unrestricted rotary coupling of spherical probe tip 30 to head 104 as it moves up and down. A magnet located inside of three-point pivot mount can be used to hold spherical probe tip 30 in place. Base 12 of ACMM 10 can be kinematically attached to moving stage 100, optionally with one or more magnets to hold the base 12 to the stage 100. A spring (not shown) can be used to urge the base 12 against stage 100. If the existing stage 100 is too short to hold ACMM 10, an extension 112 can be attached to the existing stage 100.

The arrangement shown in FIG. 9 can be used to provide highly accurate, real-time 1-D, 2-D, or 3-D position information for use in a feedback closed-loop control system. ACMM 10 measures the true position of machine head 104 relative to the workpiece 102 during machining operations. This true position can be compared, in real-time, to the commanded position by the position control unit inside of machine 108. Any error between the commanded position and the true position can be detected and corrected, for any point within the working volume of machine 108.

The arrangement shown in FIG. 9 can also be used to rapidly calibrate the motions of 3-axis milling machine 108. Machine 108 can be commanded to trace out the entire volume of its workspace, and the error between the commanded positions and the true positions measured by ACMM 10 can be compared to create a volumetric error map. This can reduce the need for using certified metrology artifacts.

Figure 10:
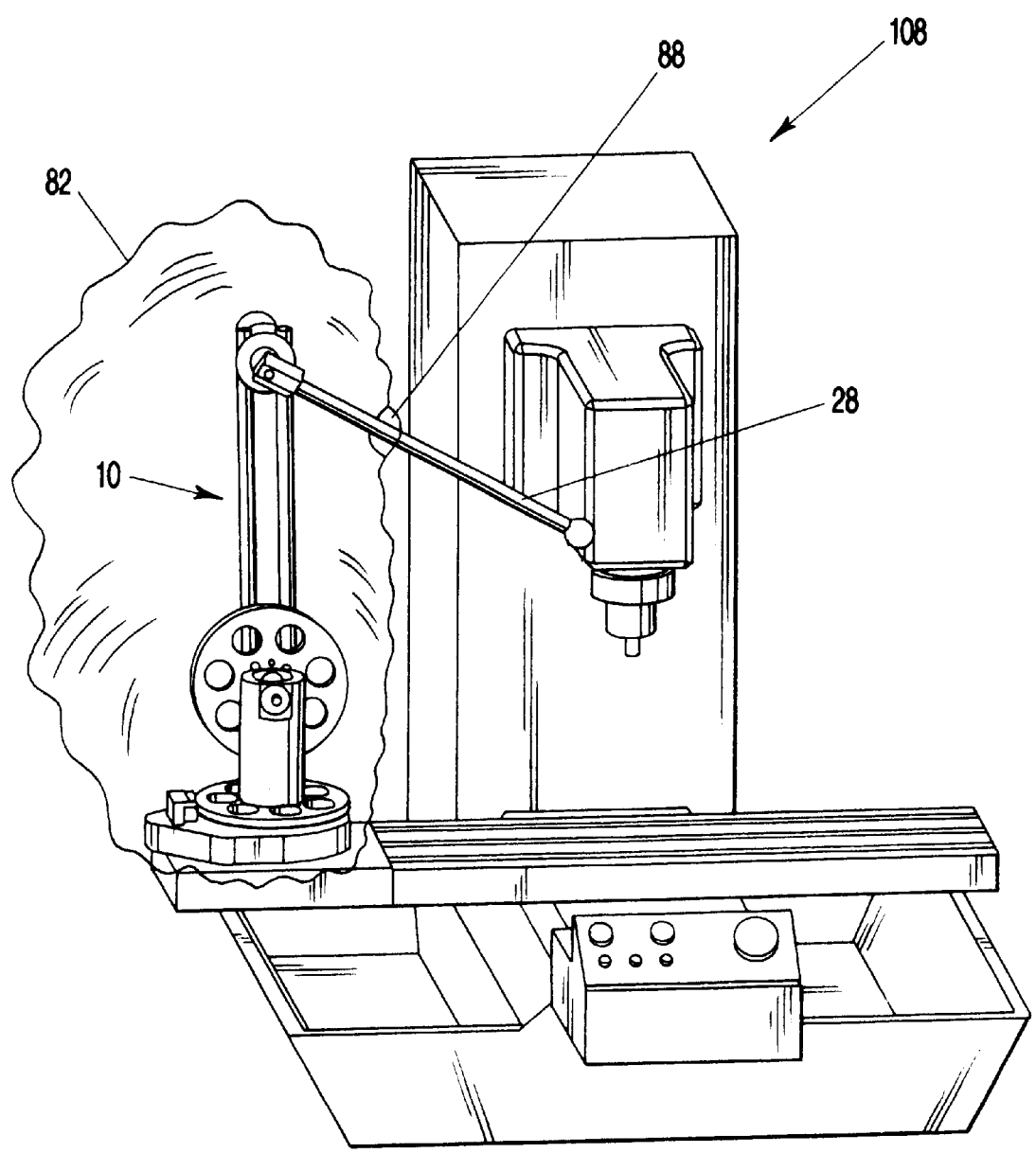
FIG. 10 shows a schematic isometric view of a fifth example of a highly accurate articulated coordinate measuring machine, attached to a 3-axis CNC milling machine for providing position feedback control, or for calibration purposes, with a flexible bag or bellows surrounding the ACMM, according to the present invention.

FIG. 10 shows a schematic isometric view of a fifth example of a highly accurate articulated coordinate measuring machine 10, attached to a 3-axis CNC milling machine 108 for providing position feedback control, or for calibration purposes, with a flexible bag 82 or protective enclosure surrounding the CMM, according to the present invention. Bag 82 can provide a thermally-stable atmosphere around ACMM 10, to help prevent errors from thermal distortion. Also, bag 82 can protect sensitive components inside of ACMM 10 from external contamination. Examples of contaminants include dust, dirt, cutting chips, cutting fluid, sparks, etc. These contaminants can be excluded from moving surfaces, such as the ball bearing assemblies, and from position encoder tapes and sensors by using bag 82. Bag 82 should not restrict the motion of ACMM 10, and can have a penetration 88 for passing upper arm 28 through. Bag 82 can be transparent. Bag 82 can be a flexible bellows.

The present invention can have a 3-D position accuracy of the probe tip 30 relative to the base 12 of less than 10 microns. The means for measuring the rotation angle of a revolute joint can have an accuracy of +/−1 arcsecond, and can have a resolution greater than or equal to 3 counts per arcsecond. The present invention can further comprise means for converting the three rotation angles into a set of three-dimensional Cartesian coordinates representing the position of the probe tip 30. The present invention can further comprise means for measuring the incremental rotation angles of the first, second, and third revolute joints; and means for converting the three incremental rotation angles into a set of three-dimensional Cartesian coordinates representing the incremental position of the probe, relative to a previously known position.

Figure 11:
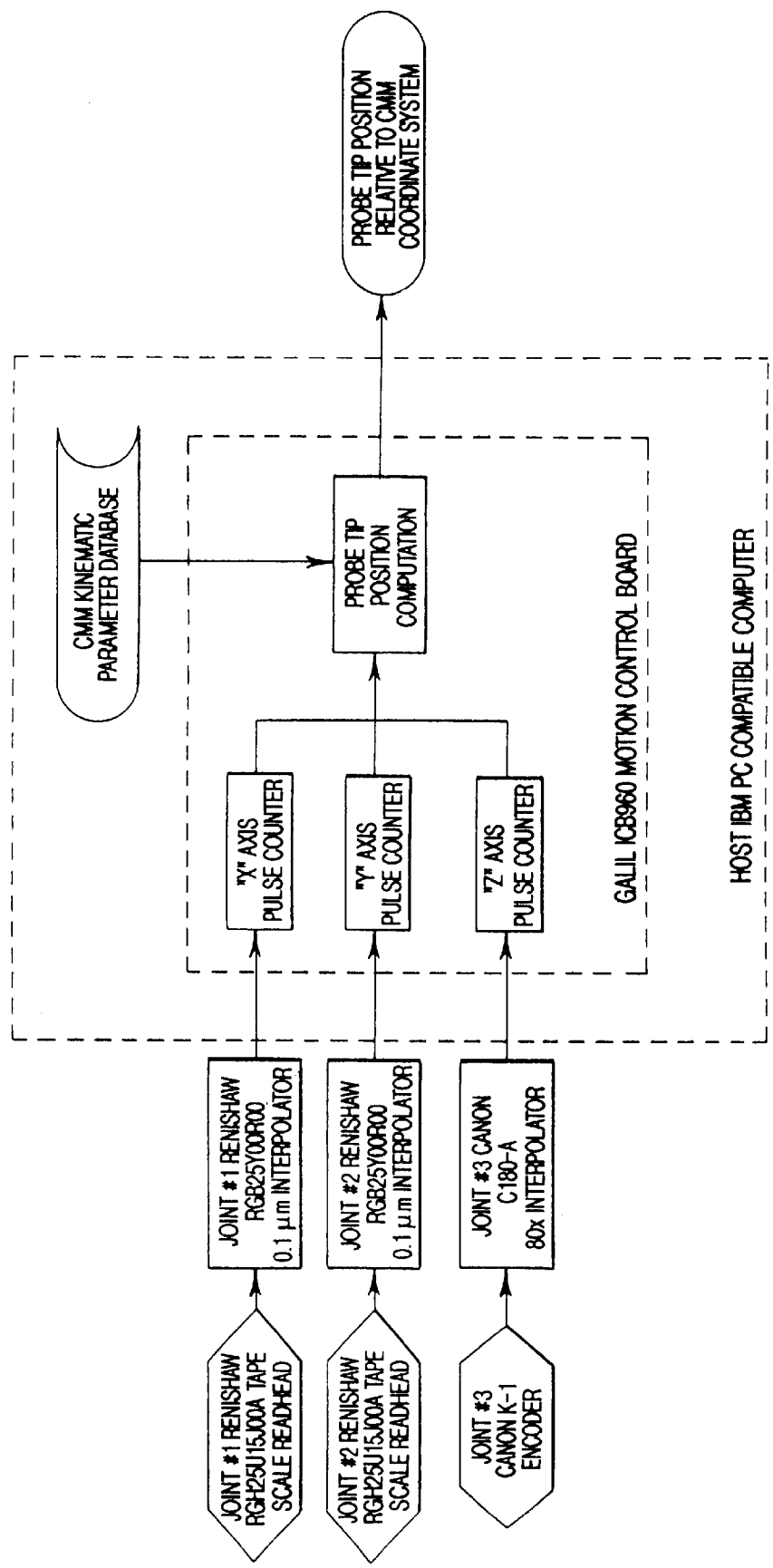
FIG. 11 shows a first example of a block diagram of the position data collection and analysis system, according to the present invention.

FIG. 11 shows a first example of a block diagram of a coordinate processing data collection and analysis system, according to the present invention. In this example, joints 14 and 18 both use a Renishaw, Inc. RGH25U15J00A tape scale readhead for sensing the lines scribed on the 20 micron Renishaw encoder tapes 44 and 56, respectively. The output of the Renishaw readhead goes to a Renishaw RGB25Y00R00 Interpolator module, which provides a position accuracy of 0.1 microns. The third revolute joint 24 uses a Canon, Inc. K-1 optical angle encoder 70. The output of the K-1 encoder goes to a Canon, Inc. C180-A 80X interpolator module. The outputs from each interpolator module then goes to a Galil, Inc. ICZB960 motion control board, which counts the number of pulses (e.g. lines) for each of the three joint encoders. The Galil motion control board interfaces with a host IBM PC compatible computer. The PC computer provides the kinematic parameter database parameters (e.g. length of arms 22 and 28, diameters of circular wheels 42 and 56, etc.), and the governing geometrical relationships to allow the computer to convert the number of pulses counted for each of the three joint encoders into the position probe tip 30, relative to the ACMM coordinate system.

After all of the components of ACMM 10 have been assembled, the exact dimensions of the critical components, and the overall kinematic parameters are precisely measured to take care of any assembly inaccuracies.

FIG. 12 shows a schematic isometric view of a sixth example of a highly accurate two-axis articulated coordinate measuring machine 210, attached to a horizontal CNC lathe machine 114 for providing position feedback control, or for calibration purposes, according to the present invention. Two-axis ACMM 210 comprises a support base 212, adapted to be rigidly fixed to a working surface 120 (e.g. tail stock), relative to which the two-dimensional, axisymmetric spatial coordinates of the probe tip 230 can be measured. Not shown in FIG. 12 are means for converting the two measured angles of rotation ($\theta_1$ and $\theta_2$) into cylindrical (e.g. axisymmetric) coordinates (R, Z). Probe tip 230 can be a precision gauge ball, or other probe tip geometry, as needed. Tip 230 can be magnetically attached to a three-point pivot mount 125, which is rigidly attached to tool holder 126, which holds tool 128. Tool 128 cuts workpiece 118 as it rotates about the axis of symmetry 122. Workpiece 118 is held by lathe chuck 116, which is rotated by lathe motor 114 about the axis of symmetry 122.

Referring still to FIG. 12, ACMM 210 includes a first revolute joint 214 that is mounted to post 248. Joint 214 has a first axis of revolution 216, which is oriented perpendicular to the axis of symmetry 122. In the example shown in FIG. 12, first axis 216 is nominally oriented horizontally. ACMM 210 further includes a second revolute joint 218. Second joint 218 has a second axis of revolution 220 that is oriented parallel to the first axis of revolution 216. ACMM 210 includes a pair of rigid lower support arms 235 and 236, having proximal ends rigidly connected to first joint 218. Lower support arms 235 and 236 each have a longitudinal axis aligned perpendicular to first axis 216 and perpendicular to second axis 220.

Referring still to FIG. 12, ACMM 210 further includes a rigid upper support arm 228, having a proximal end rigidly connected to the second joint 218. Probe arm 228 has a longitudinal axis aligned perpendicular to second axis 216. Therefore, the plane in which the upper arm 228 rotates is parallel to the plane in which the lower support arms 235 and 236 rotate.

In FIG. 12, ACMM 210 includes a probe tip 230, attached to the distal end of the probe arm 228. Probe tip 230 can be a precision gauge ball. However, other probe tip geometries, well-known to those skilled in the art, can be used in place of a gauge sphere (e.g. single touch probe, multiple touch probes, trigger probes, contact probe, constant-force touch probes, or non-contacting electrostatic or laser probes). ACMM 210 further includes means for measuring the rotation angles $\theta_1$, and $\theta_2$ of the first and second revolute joints 214 and 218, respectively. ACMM 210 can include a circular wheel 242, which has a diameter greater than 4.5 inches, to provide sufficient angular accuracy. Wheel 242 can have an optical encoder tape 244 wrapped around, and rigidly attached to, wheel 242. Wheel 242 can have a diameter of 4.85 inches, and can be wrapped with a Renishaw encoder tape 244 having 0.1 micron effective resolution, thereby providing an angular resolution of 3 counts/arcsecond. Base 212 can have three spherical ball mounts 232 rigidly attached to the bottom of base 212. Mounts 232 can be arranged 120 degrees apart. Mounting plate 233 is attached to tailstock 120, and plate 233 has places to receive ball mounts 232, thereby providing full kinematic constraint in 6-axes to base 212.

Probe tip 230 can be used to provide real-time position feedback control during machining for the motion of tool holder 126, holding tool 128. Probe tip 230 can also be detached from three-point pivot mount 125 and used to check the surface profile of workpiece 118 during pauses in the machining cycle.

Figure 13:
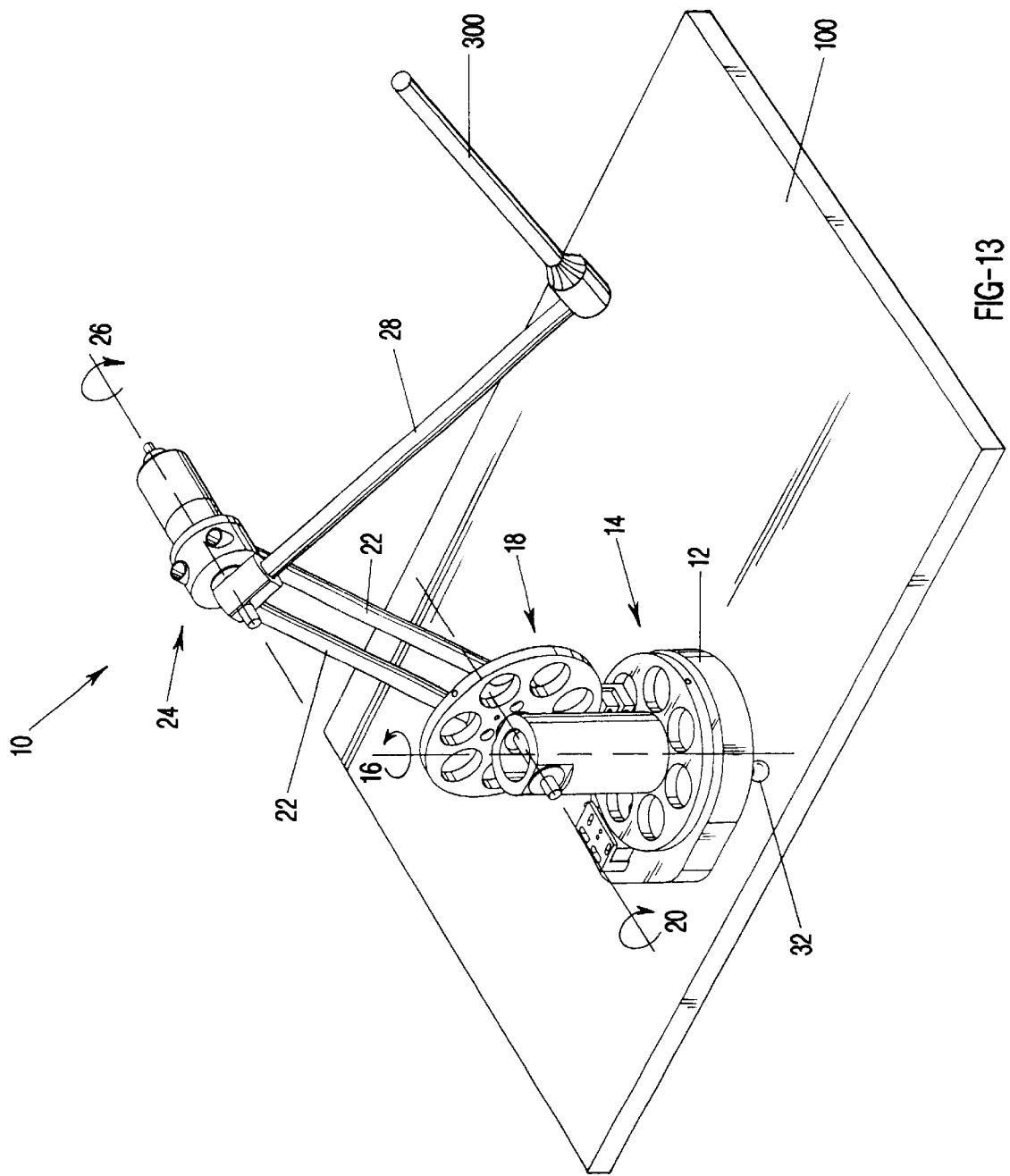
FIG. 13 shows a schematic isometric view of a seventh example of a highly accurate articulated coordinate measuring machine, with an attached wand for using as a 3-D computer interface device, according to the present invention.

FIG. 13 shows a schematic isometric view of a seventh example of a highly accurate articulated coordinate measuring machine, with an wand 300 pivotally attached to probe arm 28 for use as a 3-D computer interface device, according to the present invention. Wand 300 can be a rod or tube with a socket into which spherical probe tip 30 can be inserted to form a ball-and-socket (e.g. gimbaled) joint. Wand 300 can be grasped by the hand or foot, and used to manipulate the position of probe tip 30 within a workspace, thereby providing 3-D spatial coordinate input to a computer software program. Alternatively, wand 300 can be used to guide probe 30, thereby functioning as a 2-D or 3-D computer mouse, for moving a computer cursor symbol in a virtual computer environment.

Figure 14:
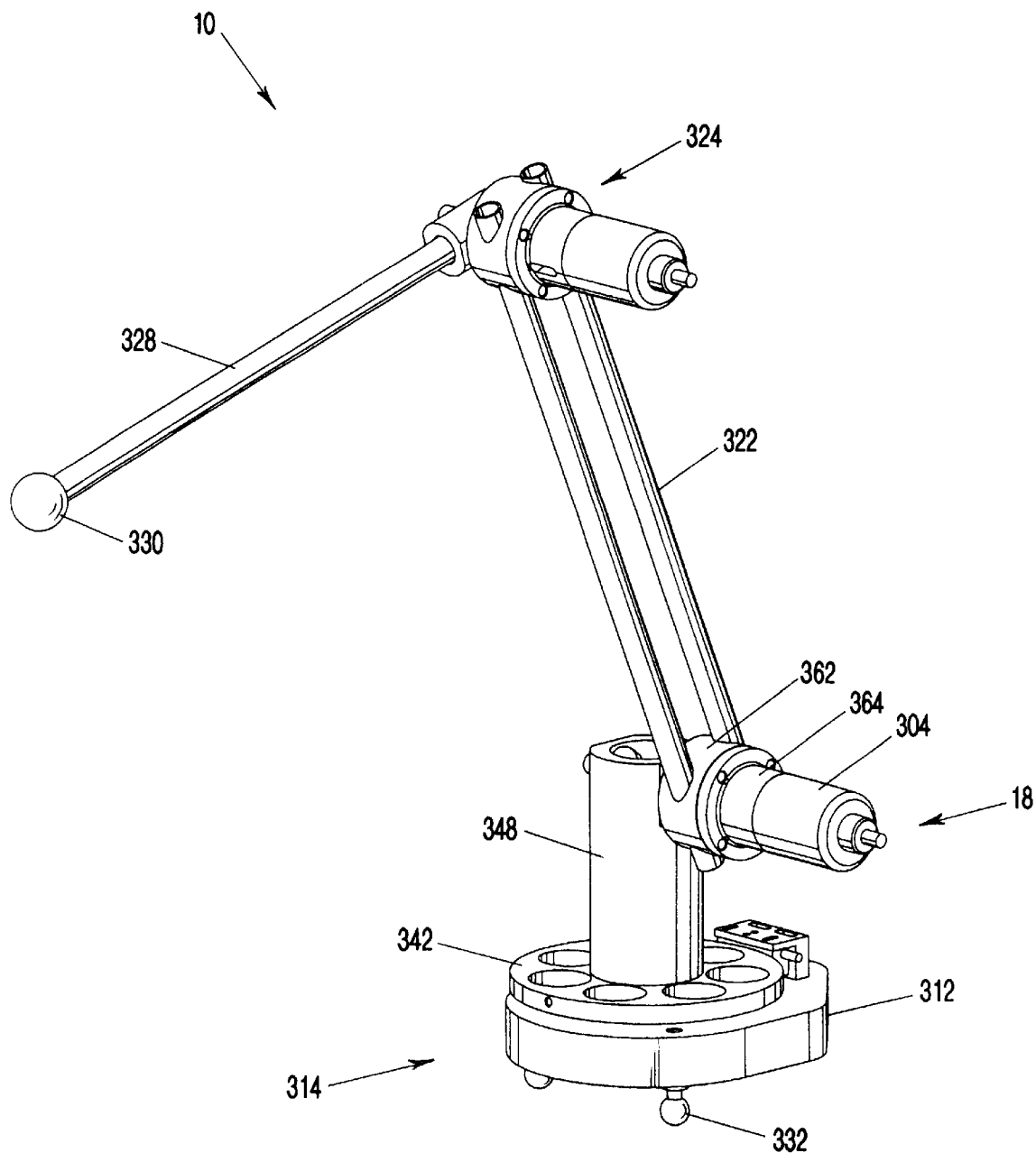
FIG. 14 shows a schematic isometric view of a eighth example of a highly accurate articulated coordinate measuring machine, according to the present invention.

FIG. 14 shows a schematic isometric view of a eighth example of a highly accurate articulated coordinate measuring machine, according to the present invention. The second joint, joint 18, can be compact, lightweight optical angle encoder 304, such as a Canon K-1 laser angle encoder.

Figure 15:
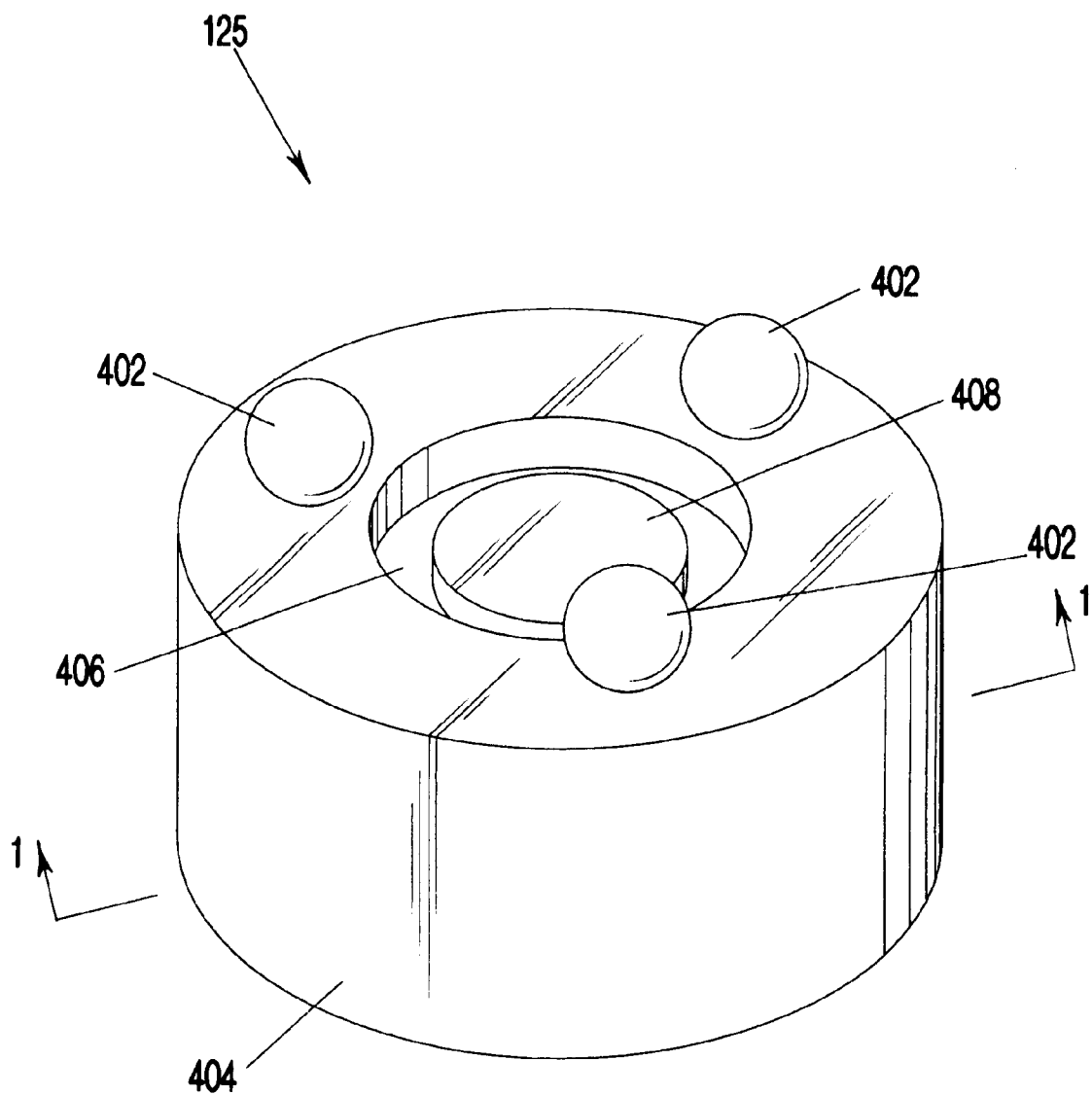
FIG. 15 shows a schematic isometric view of a first example of a three-point pivot mount, according to the present invention.
Figure 16:
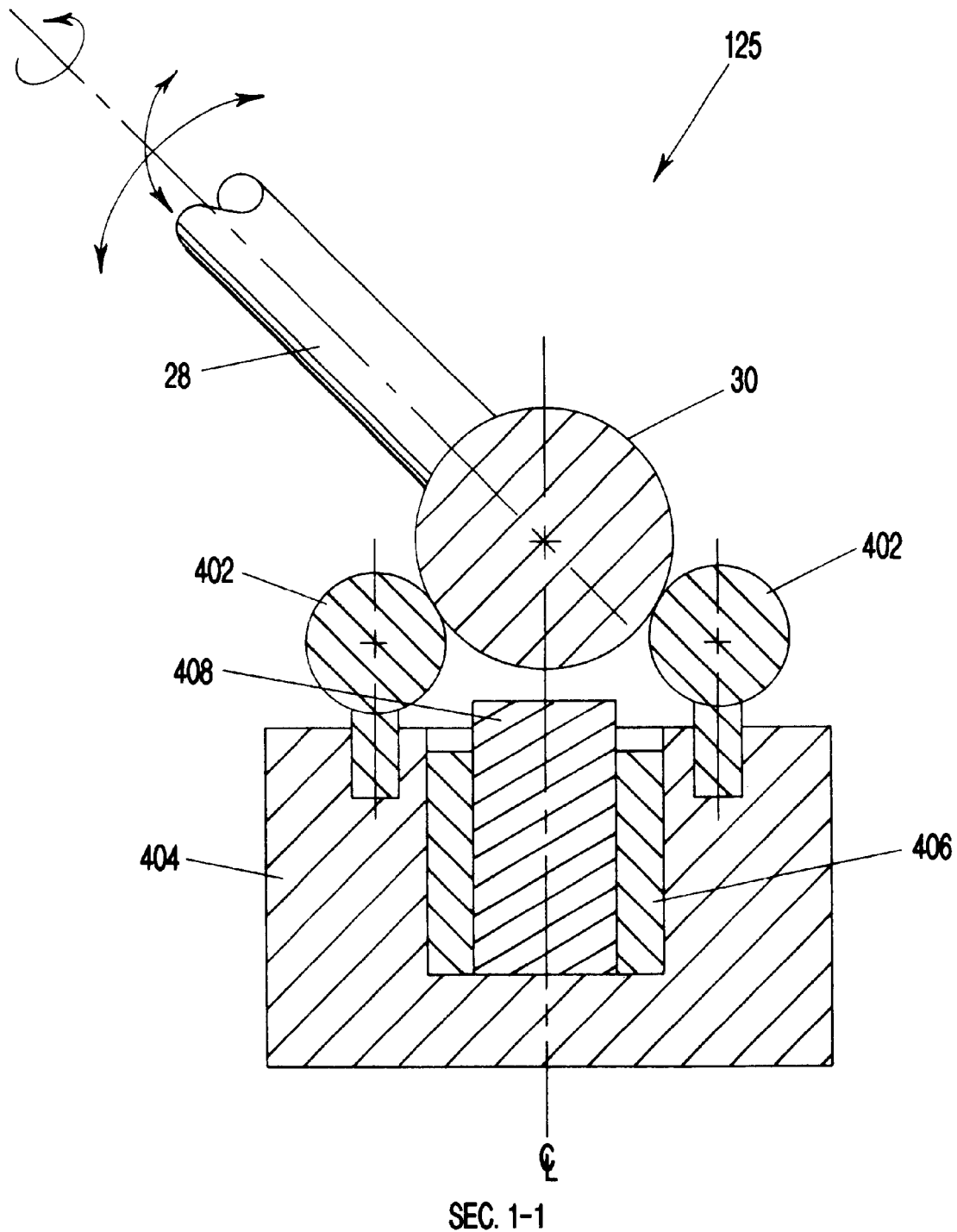
FIG. 16 shows a schematic cross-section view of a first example of a three-point pivot mount, according to the present invention.

FIG. 15 shows a schematic isometric view, and FIG. 16 shows a cross-section view,,of a first example of a three-point pivot mount 125, according to the present invention. Three-point pivot mount 125 provides a low-friction, kinematic mount for rigidly holding spherical ball probe tip 30 in a stable, tripod-like geometry. Mount 125 includes three precision-machined tooling balls 402 rigidly mounted to a cylindrical body 404, and arranged approximately 120 degrees apart. This triangular arrangement provides for three points of contact with probe tip 30. The three-points of contact constrain all three translational degrees of freedom for probe tip 30 (e.g. X, Y, Z), but allow for unconstrained rotation of probe tip 30 about all three orthogonal axes. Base 404 houses a cylindrical magnet 408, rigidly mounted along the centerline of body 404. Non-magnetic annular ring 406 provides separation between magnet 408 and body 404. Ring 406 can be made of aluminum. Magnet 408 provides the force necessary to hold a magnetic probe tip 30 in contact with the three tooling balls 402. The three tooling balls 402 can be press-fit into body 404. Ring 406 and magnet 408 can be mounted in epoxy.

Alternatively, three-point pivot mount 125 can comprise a gimbaled geometry; a universal joint geometry, or a ball-and-socket geometry, depending on the requirements. Mount body 404 can be magnetically attached to tool holder 126, as shown in FIG. 12, or permanently attached via screws, or other well-known means.

All machine tool and robotic arm position controllers are model-based, meaning that the controller uses a mathematical relation to convert motions occurring at the joint axes (e.g. three angles of revolution, $\theta_1$, $\theta_2$, and $\theta_3$) of the mechanism into the resulting motion at the tool tip (e.g. X, Y, Z of the probe tip 30). A kinematic model mathematically describes how the individual motions of interconnected components in a mechanism contribute to the overall motion of the tool point. An accurate kinematic model for a particular mechanism will provide accurate solutions for tool tip position, orientation (e.g. pose), velocity, and acceleration only if the values of the kinematic parameters upon which the model is based are an accurate reflection of the critical physical attributes of the system being controlled. Kinematic parameters, therefore, are the dimensions of the mechanism's components that directly govern the mechanism's positioning accuracy.

In the present invention, the kinematic parameters include the link lengths (e.g. lengths between the axes of rotations for each pair of joints), twist angles, offset distances, and rotation angles at each joint. By knowing the kinematic parameters for each link, coordinate transformations may be created which express the position and orientation of link 1 relative to link 2; 2 relative to 3; and so on. By multiplying together the transformations between each link, the position of the probe tip may be determined relative to the origin of the work frame. In the example of the present invention having three serially-linked revolute joints (e.g. 3 degrees-of-freedom), there are thirteen independent kinematic parameters. Because the present invention is a serial device (e.g. having only serially linked joints), the basic kinematic parameters are not inherently cross-coupled. Since the calibration process for ACMM 10 relies on direct inspection, the measured kinematic parameters will not become cross-coupled during calibration.

For each kinematic parameter, there is an associated error that contributes to the total position error of the tool tip (e.g. probe tip 30). For example, a common three-axis milling machine has a total of twenty-one individual kinematic parameters, each having their own errors. Many sources can contribute to each error, including: thermal effects, encoder accuracy and repeatability, imparted mechanical loads, imparted gravitational loads, bearing error motions (radial, face, tilt), and accuracy of device calibration. For the present invention, a total of 40 factors were considered to contribute to the uncertainty in the thirteen kinematic parameters. We have estimated that the worst case combined uncertainty (e.g. error) in the reported position of the tool tip is 18 microns for the example of the present invention illustrated in FIGS. 4, 5a, 5b, 5c, 5d, and 6. However, recent improvements in the Renishaw, Inc. flexible tape scale interpolator electronics to 50 nm resolution may reduce this worst case uncertainty to less than 10 microns. See "Development of an Independent Real-Time Position Feedback Device for CNC Machining Operations", B. Jokiel, L. Bieg, M. Ensz, Proceedings of the American Society for Precision Engineering, Winter 2000 Annual Meeting, Scottsdale, Ariz., which is herein incorporated by reference.

Calibration of the ACMM 10 involves determining as best as possible all thirteen kinematic parameters. A large, gantry or bridge-style, three-axis orthogonal CMM (e.g. a reference metrology tool having an accuracy much greater then ACMM 10) can be used to measure the dimensions of ACMM 10. This allows calculation of an initial set of the 13 parameters. Next, the ultra-accurate, three-axis orthogonal CCM measures the position of the probe tip 30 as the tip is moved throughout the extremities of its workspace for a large number of poses (e.g. 250 poses). Here, we define "pose" as a specific position and orientation of the links of ACMM 10. For example, a specific pose could correspond to the following set of joint angular coordinates: $\theta_1$=30 degrees, $\theta_2$=50 degrees, and $\theta_3$=10 degrees. Preferably, a multi-probe with 5 ruby-sphere tips is mounted to probe tip 30 in place of the spherical ball tip. This then provides 5×250=1250 points for the 250 poses. Then, by using a least-squares minimization algorithm, a set of best-fit kinematic parameters can be calculated that minimizes the average global error within the workspace. The present invention can include means for storing and using this set of best-fit kinematic parameters for the device.

Once the set of best-fit kinematic parameters have been calculated and stored in the microprocessor's memory, a second set of poses are measured by the reference metrology tool (e.g. ultra-accurate CMM machine). Using this second set of measured positions, a residual error map can be created by comparing the apparent position of the probe tip (as reported by the calibrated ACMM 10 using the new, best-fit kinematic parameters) to the true position of the probe tip (as measured by the reference metrology tool). The error map can be represented mathematically by multi-variable polynomial functions. The present invention can include means for storing the residual error map in microprocessor memory. Once the residual error map has been created and stored, the position of the probe tip as reported by the calibrated ACMM 10 can then be corrected, in real-time, by referring to the stored residual error map. ACMM 10 can include error-correction means for storing and using the residual error map to correct the position of the probe tip as reported by calibrated ACMM 10. In principle, this error-correction procedure would improve the accuracy of the ACMM 10 to the level of the reference metrology tool, which can be better than 0.0001 inches (e.g. 2.5 microns).

Figure 17:
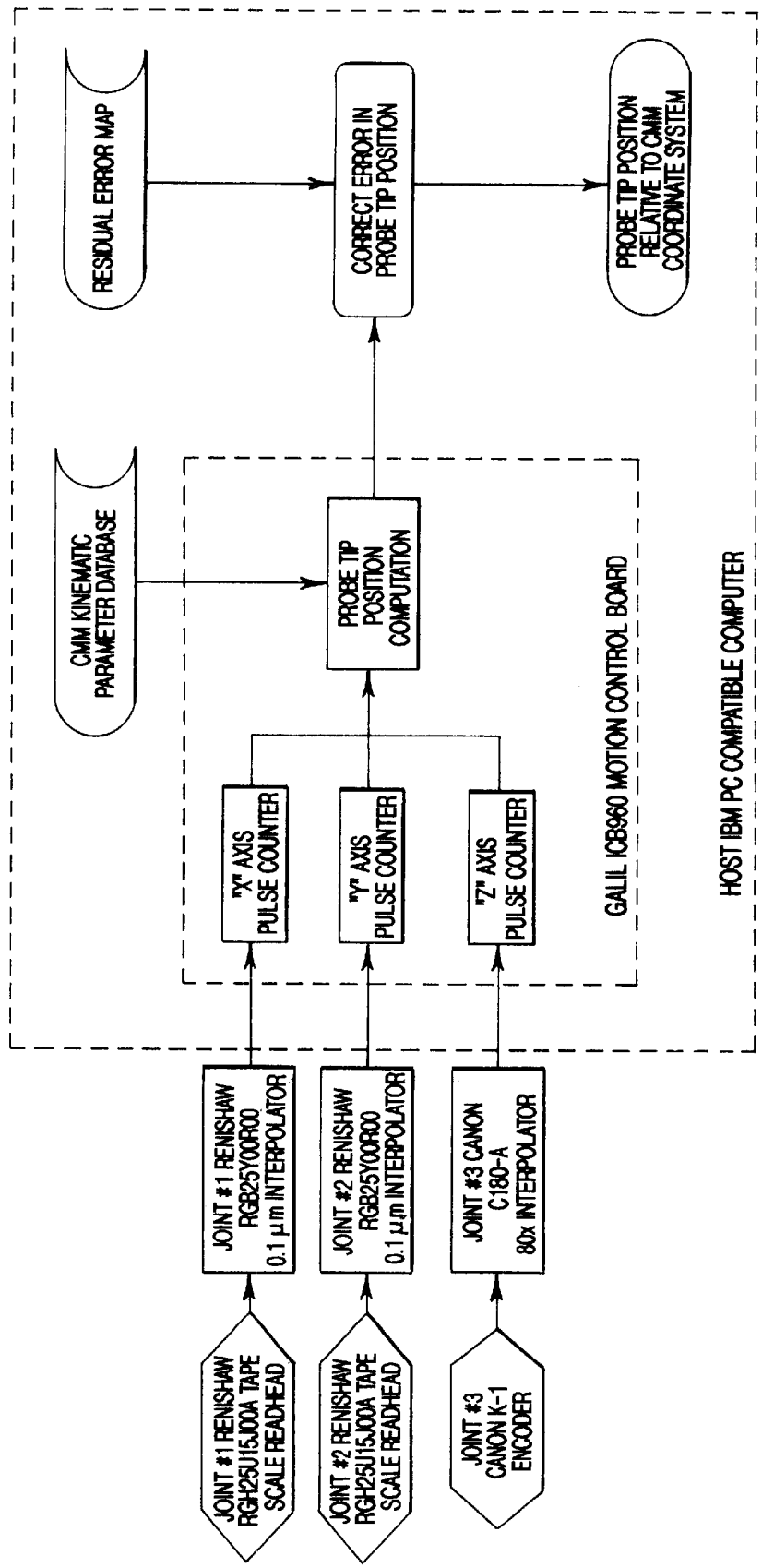
FIG. 17 shows a second example of a block diagram of the position data collection and analysis system, according to the present invention.

FIG. 17 shows a second example of a block diagram of the coordinate processing data collection and analysis system, according to the present invention. FIG. 17 is identical to FIG. 11, except that two additional blocks have been added. After the motion control board has computed the probe tip's apparent position, a correction in this position is then made by the host computer. This correction, as described above, is based on using Residual Error Map, which has been stored in the host computer's memory. After performing the error correction step, the host computer calculates the probe tip's position relative to the ACMM's coordinate system.

The method of using ACMM 10 can comprise the following steps. Mounting plate 233 can be rigidly attached to working surface 100 or tailstock 120. Base 12 is then mounted to plate 233, while aligning mounting feet 32 in their respective matched pair of cylinders 510. ACMM 10 is then initialized to a "home" position by placing probe tip 30 at the home location. This defines a reference "zero" for the angle encoders. Next, the probe tip 30 is moved to a new location, and the new position is computed by reading the angle encoders and converting the three angles to X,Y,Z coordinates by a microprocessor, as shown in FIG. 11. The step of initializing the ACMM 10 to a home position can be skipped if absolute angle encoders are used, instead of incremental angle encoders. The microprocessor can provide real-time error correction of the probe tip's position by updating the measured coordinates with reference to a residual error map stored in its memory.

Probe tip 30 can be moved by hand, if desired. Wand 300 can be attached to probe tip 30, and grasped by a hand to permit ease of manipulation, for example, during microsurgery, or 3-D interfacing with a computer. Alternatively, probe tip 30 can be placed into contact with three-point pivot mount 125, which has been rigidly attached to a moving machine member (e.g. robotic arm, quill head of a milling machine, or tool holder of a lathe machine). This allow the motion of the moving member to automatically move and position probe tip 30 without human intervention (e.g. unattended operation). Such an arrangement would be useful for providing independent, real-time feedback control during machining operations. Alternatively, three-point pivot mount 125 can be inserted directly into the tool holder or end effector position, with probe tip 30 mounted to three-point pivot mount 125. In this configuration, the three-dimensional positional performance of the machine tool or robotic arm can be rapidly assessed.

Figure 18:
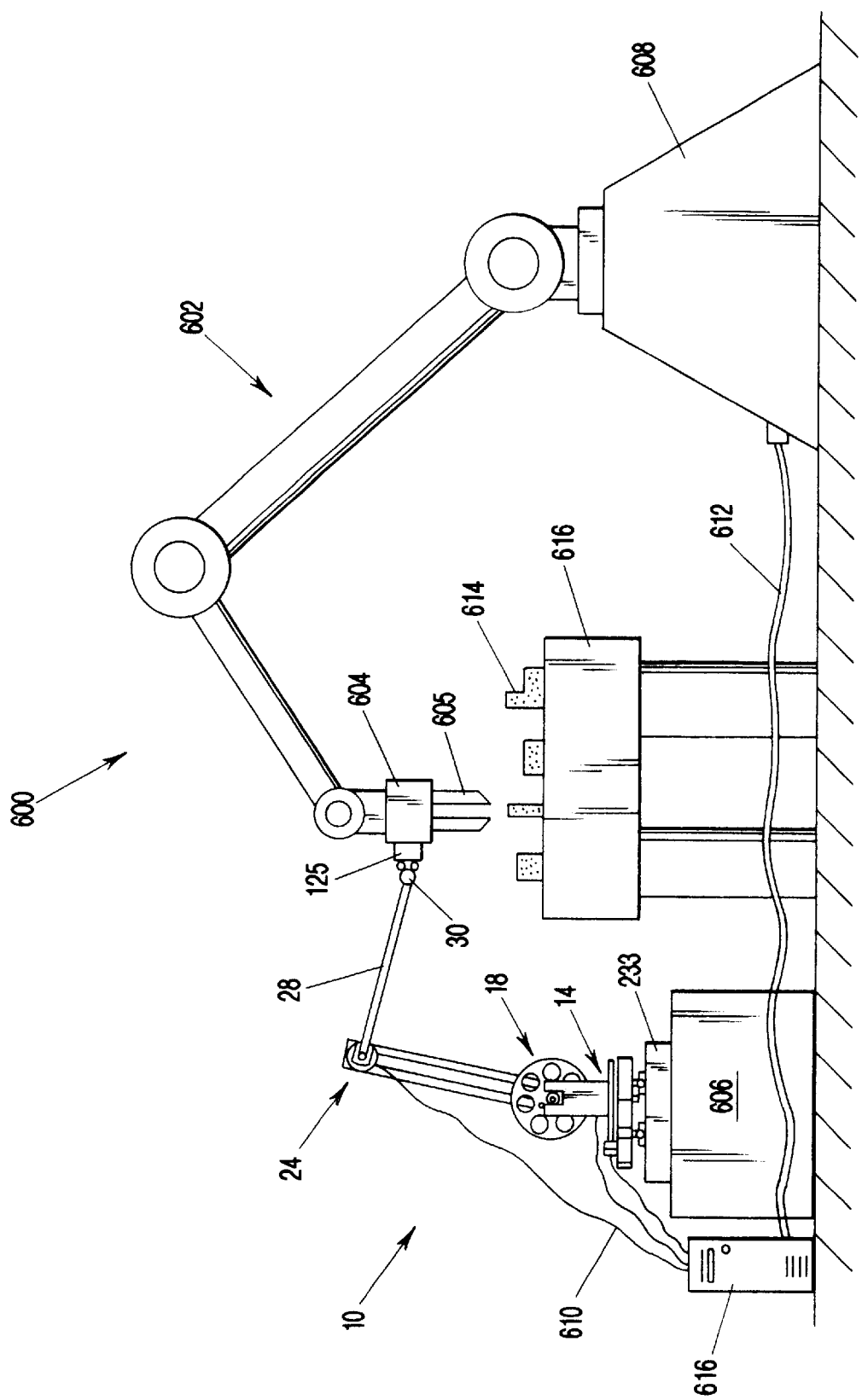
FIG. 18 shows a schematic side view of a ninth example of a metrology system for providing independent, real-time, position feedback control, according to the present invention.

FIG. 18 shows a schematic side view of a ninth example of a metrology system 600 for providing independent, real-time, position feedback control, according to the present invention. System 600 comprises an articulated coordinate measuring machine (ACMM) 10, having a probe tip 30 pivotally mounted to a movable member 604 of a machine 602. In FIG. 18, the machine shown is an articulated robotic arm 602, having multiple axes of rotation, supported by a base 608. Movable member 604 has an end effector 605 for gripping parts 614 and lifting or moving them about the surface of table 616. Data communications cable 612 transfers coordinate data for the position of end effector 605 from robotic arm 602 to comparator processing means 616.

In the example shown in FIG. 18, ACMM 10 has three revolute joints, 14, 18, and 24. Probe tip 30 is attached to probe arm 28. Probe tip 30 is also pivotally mounted to pivot mount 125. Pivot mount 125 is rigidly attached to movable member 604. Pivot mount 125 can use magnetic means to allow the spherical ball of probe tip 30 to rotate freely in a low-friction kinematic mount, while simultaneously constraining translational motion with respect to the body of pivot mount 125. ACMM 10 can be kinematically mounted to base plate 233. Base plate 233 can be rigidly attached to the top surface of a heavy and rigid support base 606. This arrangement provides a reference surface on which base plate 233 has a fixed spatial relationship to the machine's base 608.

FIG. 18 shows an example where base 608 and base 606 are independent bases resting on a common surface (e.g. on the floor). Measurement accuracy is improved if the relative motion between bases 606 and 608 are minimized as much as possible. A laser interferometer could be used to measure and monitor any relative motions between the two separate bases. Alternatively, they can be combined into a single, continuous, heavy and rigid supporting structure (not shown). The electrical output of angle encoders for joints 14, 18, and 24 of ACMM 10 can be transferred to comparator processing means 616 via data transmission cables 610. Alternatively, wireless data communication means can be used in place of cables 610. The movable member 604 of machine 602 can be moved to a home position (not shown), which provides a repeatable, well-known position in the machine's coordinate system.

Comparator processing means 616 can include coordinate transformation means, such as illustrated in FIGS. 11 or 17. Comparator processing means 616 compares the true position of the movable member 604, as measured by the coordinate measuring device 10, with the desired position of the movable member, as reported via cable 612 from robotic arm 602. This creates a position error signal, which is useful for independently evaluating the spatial positional performance of movable member 604 (e.g., for meeting American National Standard ASME B5.54).

Alternatively, comparator processing means 616 can be used in FIG. 18 to calculate the position error of the movable member 604 by comparing the true position as measured by ACMM 10 with the desired position as commanded by robotic arm 602. Comparator processing means 616 can include electronic or microprocessor means for: (1) calculating the position error, (2) feeding back the error signal to the robotic arm's position controller (not shown), and (3) adjusting the position of movable member 604, in real-time, in a manner that subsequently reduces the position error below an acceptable limit. Depending on the application, and upon the accuracy of ACMM 10, a typical acceptable position error limit could be ten microns. For more precise applications, the required error limit could be reduced to 0.0001 inches (e.g. less than 3 microns).

In another example (not illustrated) of the metrology system of the present invention, coordinate measuring machine 10 can be a portable, ACMM having six degrees of freedom, comprising three pairs of joints, where each pair of joints includes a revolute joint and a swivel joint. Commercially available versions of such a device are currently made by Romer, Inc. of Carlsbad, Calif.; and by Faro Technologies, Inc. of Lake Mary, Fla.

Figure 19:
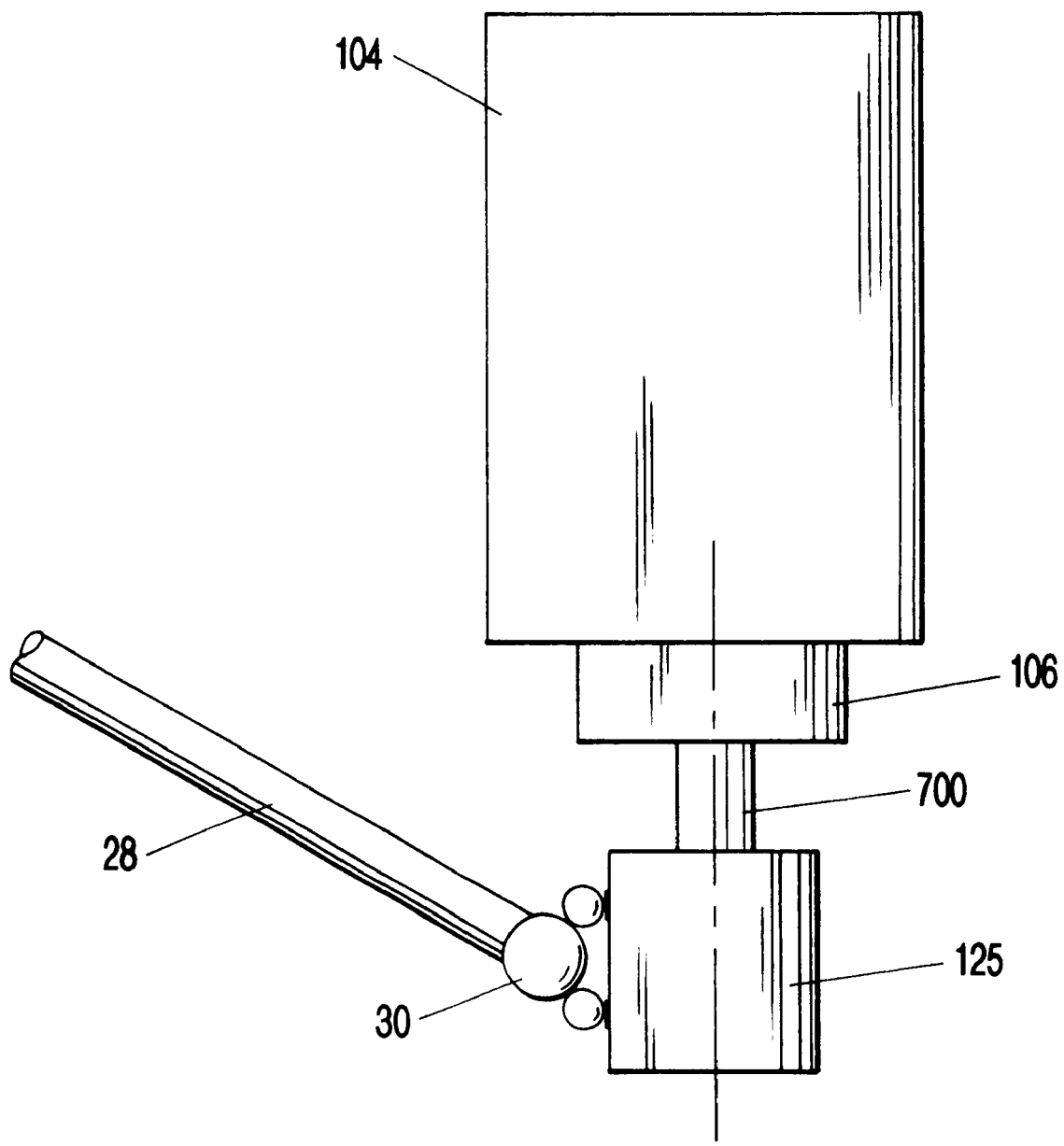
FIG. 19 shows a schematic side view of a tenth example of a metrology system for independently evaluating the spatial positional performance of a movable machine member, according to the present invention.

Referring now to FIG. 19, movable member 104 can be the quill or head of a conventional CNC three-axis milling machine. The tool holder of the milling machine is a rotating spindle 106, which moves with member 104. In this tenth example of a system of the present invention, pivot mount 125 includes a shaft 700, which can be inserted and clamped into spindle 106. The spherical ball of probe tip 30, attached to probe arm 28, can be magnetically, kinematically attached to pivot mount 125. This arrangement places the probe tip 30 closer to the actual point of operation by replacing the conventional tool piece (e.g. drill bit, milling tool) with the shaft 700 of pivot mount 125. Improved accuracy could be expected with this arrangement because the Abbe comparator offset error is reduced.

Figure 20:
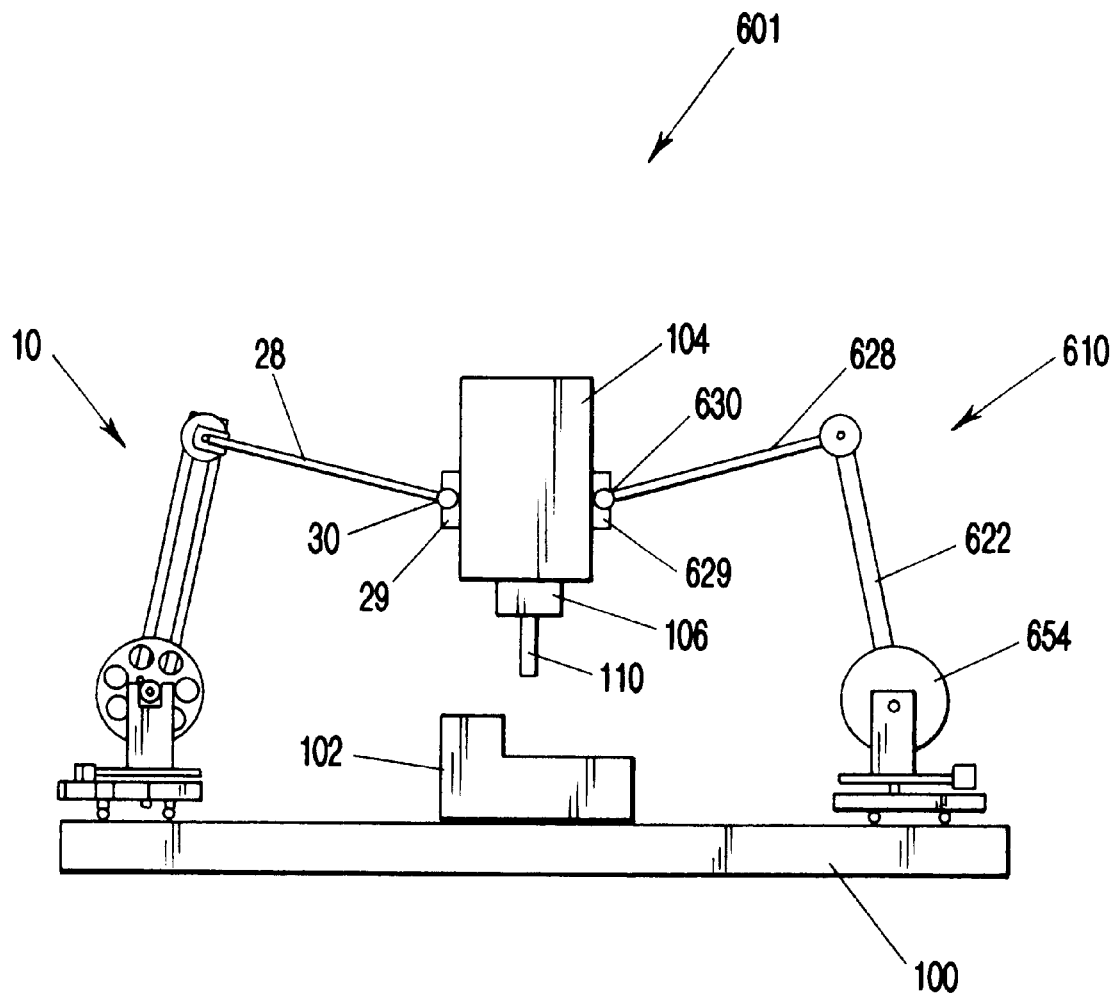
FIG. 20 shows a schematic side view of a eleventh example of a metrology system for providing independent, real-time, position feedback control, according to the present invention, including a pair of 3-axis articulated coordinate measuring machines, attached on either side of the moving machine member.

FIG. 20 shows a schematic side view of a eleventh example of a metrology system 601 for providing independent, real-time, position feedback control, or for evaluating the spatial positional performance, of a movable machine member, according to the present invention. In FIG. 20, a pair of independent, articulated coordinate measuring machines 10 and 610 is attached on opposite sides of the moving machine member 104. The second ACMM 610 is also rigidly mounted to X-Y worktable 100. Spherical ball probe tips 30 and 630 are pivotally mounted to opposite sides of member 104. The tips 30 and 630 can be mounted with ball-and-socket joints 29 and 629, respectively. In the example shown in FIG. 20, ACMM 610 can have a single lower support arm 622, and circular wheel 654 is illustrated without any weight-reducing penetrations.

The arrangement shown in FIG. 20 where a pair of 3-axis ACMM's are placed on opposite sides of movable member 104 affords the possibility of measuring not only the three spatial coordinates for the 3-D position of member 104, but also at least two coordinates for the orientation of member 104. This is illustrated further in FIG. 21.

Figure 21:
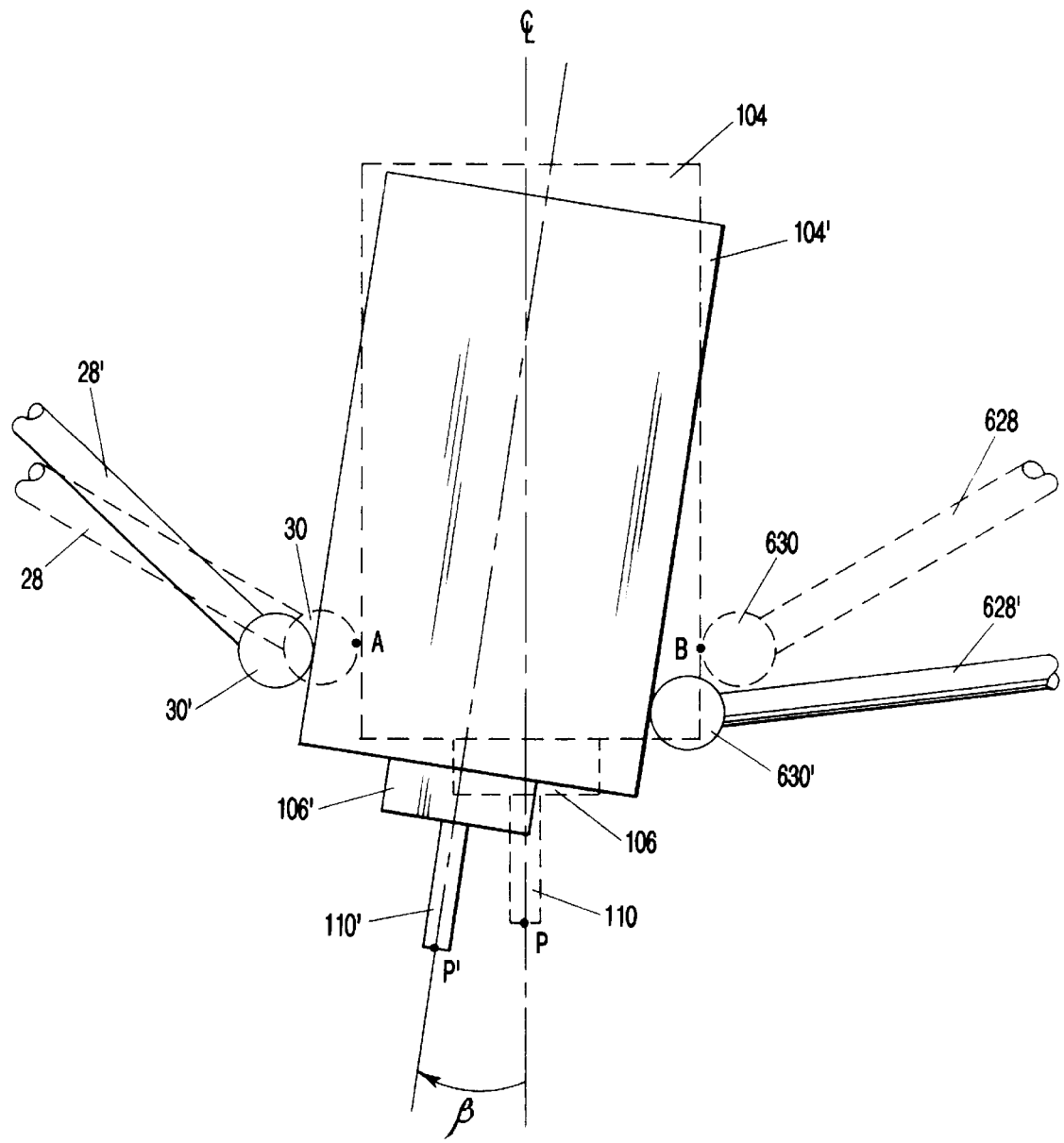
FIG. 21 shows a schematic side view of a twelfth example of a metrology system for providing independent, real-time, position feedback control, according to the present invention, including a pair of 3-axis articulated coordinate measuring machines, attached on either side of the movable machine member, which provides information about the position and orientation of the movable machine member.

FIG. 21 illustrates a "before" and "after" position for the machine head 104, rotating spindle tool holder 106, machine tool 110, and pivotally mounted probe tips 30 and 630. The operation point of tool 110 is indicated by point "P". During machining operations, for example, thermal distortions or mechanical errors can cause both the position and orientation of member 104 to move, thereby creating both a position error and an orientation error. The illustration shown in FIG. 21 greatly magnifies an example of errors in both position and orientation. Theoretically, the use of a pair of 3-axis CMM's mounted on opposite sides can measure all three orientation errors. However, in practice, any rotation of member 104 around an axis drawn between the two contact points of probe tips 30 and 630 (e.g. line A-B) can not be sensed with this configuration. The addition of a second ACMM 610 provides a second, independent measure of the translation of member 104, which can be averaged with that measured by the first ACMM 10.

Figure 31:
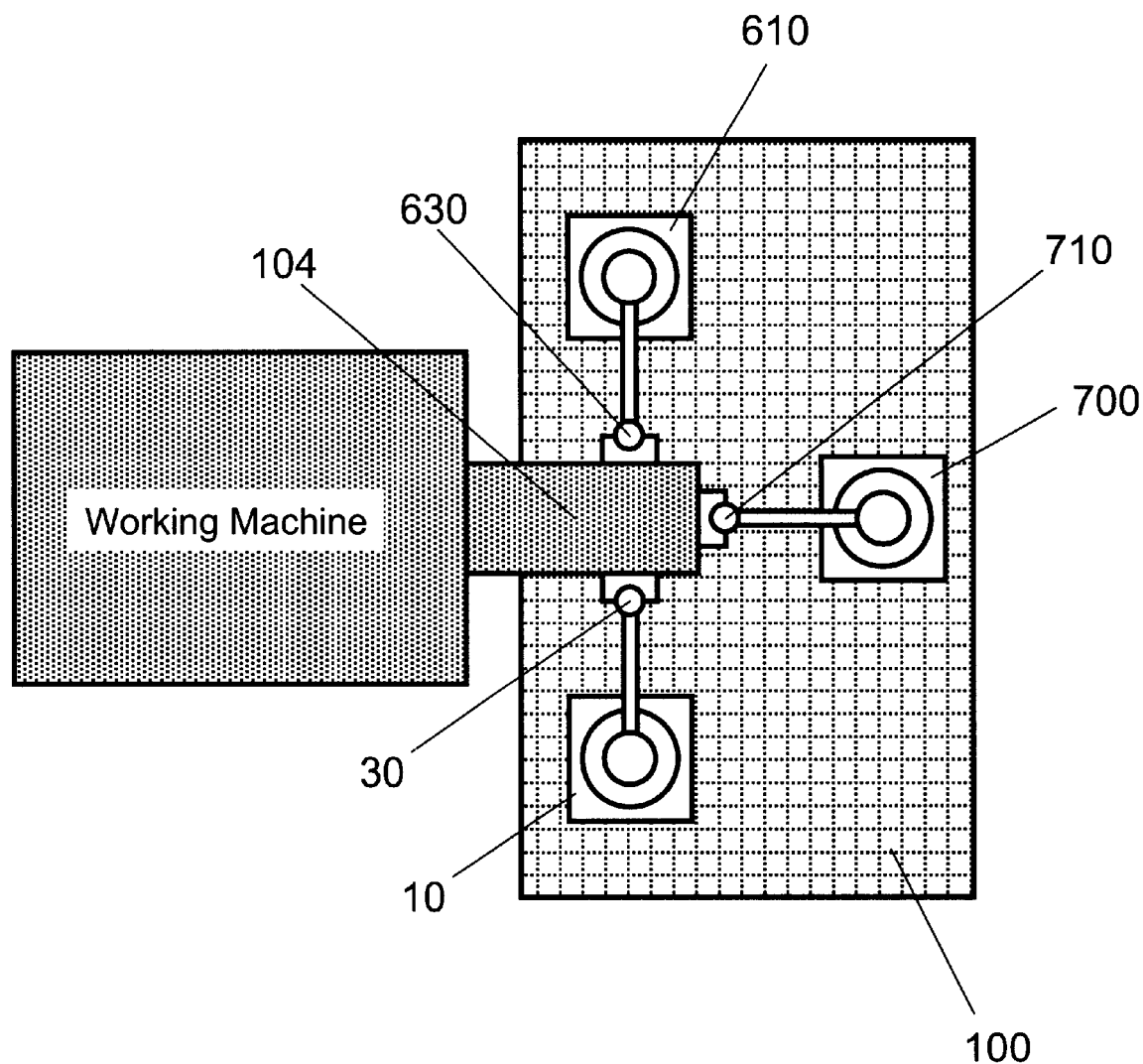
FIG. 31 shows a schematic top view of an example of a metrology system having three independent articulated coordinate measuring machines pivotally attached to a movable machine member at three different locations for measuring the three degrees of translation and the three degrees of rotation (e.g., orientation) of the movable member.

One solution to this problem is to add a third 3-axis ACMM (See FIG. 31), having a third probe tip pivotally attached to a third location on member 104. Using this configuration, all three degrees of translation, and all three degrees of rotation (e.g. orientation) of movable member 104 can be independently measured and evaluated.

Figure 22:
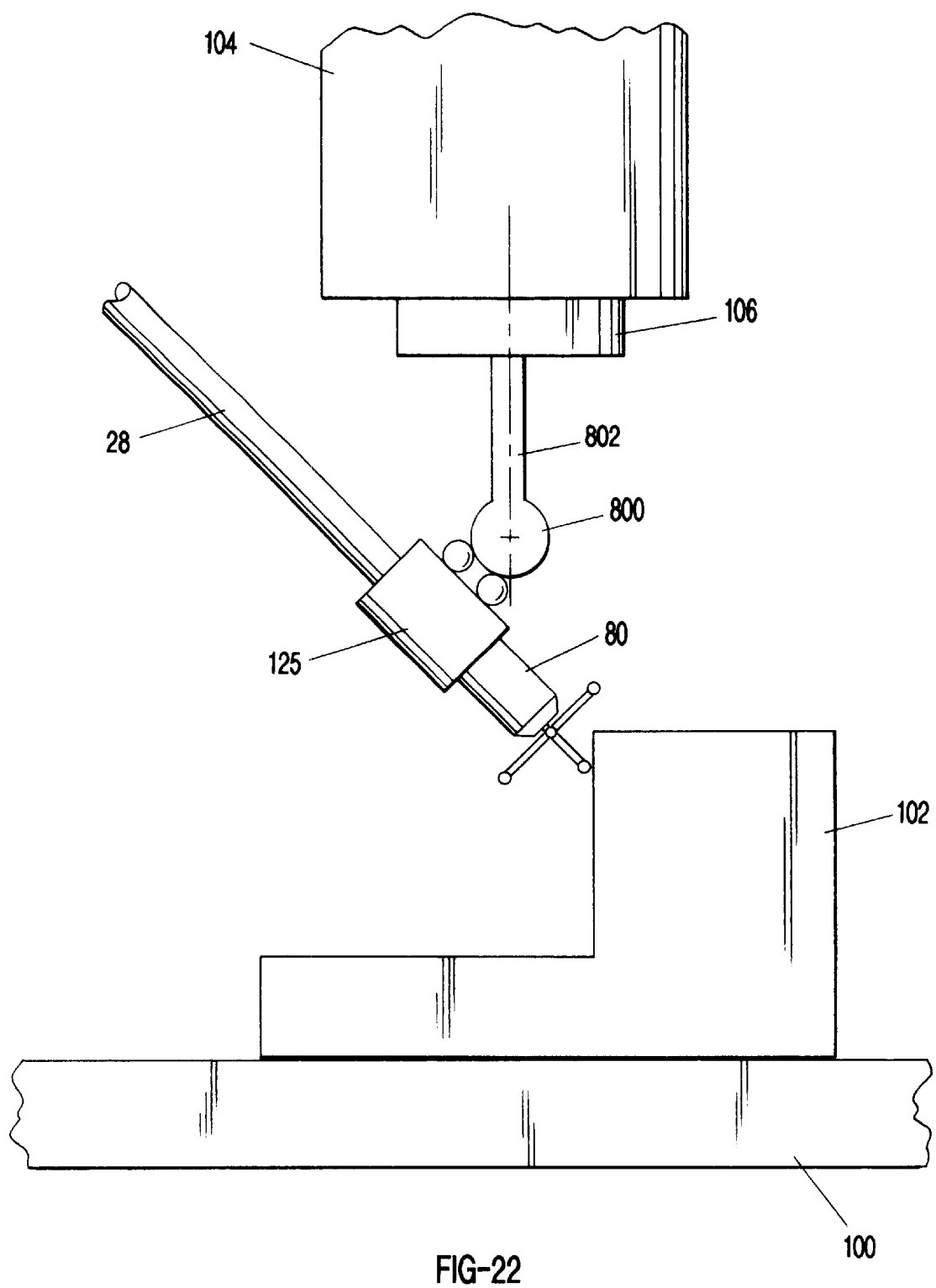
FIG. 22 shows a schematic side view of a thirteenth example of a metrology system for using a movable machine member to perform automatic, machine-guided inspection of the spatial dimensions of a part, according to the present invention.

FIG. 22 shows a schematic side view of a thirteenth example of a metrology system for using a movable member 104 of a machine to perform automatic, machine-guided inspection of the spatial dimensions of a part 102, according to the present invention. In this example, member 104 represents the quill of a conventional CNC three-axis milling machine. Part 102 is clamped to X-Y worktable 100. A precision tooling ball 800, with stem shaft 802, is inserted into spindle tool holder 106. Probe arm 28 of ACMM 10 has a pivot mount 125 attached to the distal end of arm 28. Tooling ball 800 engages pivot mount 125 and is held in place with magnetic means. Attached to the far side of pivot mount 125 is a touch probe assembly 80, comprising five touch probes. The inspection of part 102, which can be a partially machined part that is still clamped to worktable 100, can be performed automatically by machine member 104. In this example, the 3-axis milling machine is programmed to move member 104 (with attached multi-probe 80), so that the probe tip(s) contact a variety of positions on partially-machined part 102, whereby the dimensions of part 102 is accurately measured. In this way, machine member 104 automatically guides the motion of probe arm 28 throughout the inspection program in an unattended fashion.

Figure 23:
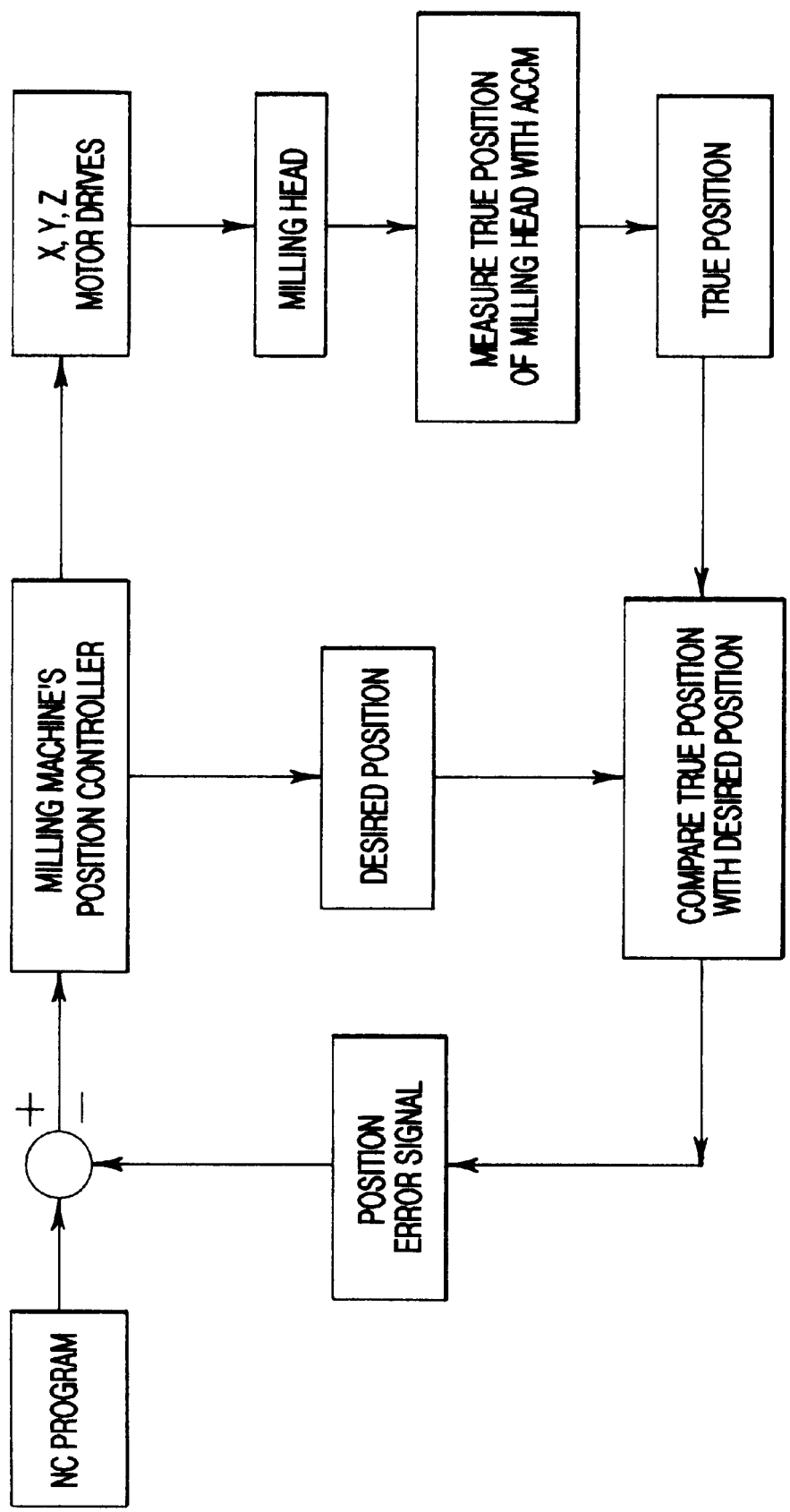
FIG. 23 shows a schematic block process diagram of a process for providing real-time feedback control, according to the present invention.

FIG. 23 shows a schematic block diagram of an example of a method of providing independent, real-time position feedback control of a movable machine member. In this example, the movable machine is a 3-D milling machine, having a milling head (e.g. quill) with a pivotally attached probe tip 30 belonging to ACMM 10. First, the coordinate system of ACMM 10 is initialized while the milling head is positioned at its home position. Then, a NC program, or other input control scheme, provides a command to the milling machine's position controller to move the milling head to a desired position. The position controller provides commands to the X,Y,Z motor drives, which move the milling head appropriately. Next, ACMM 10 measures the true position of the milling head. Then, a computer microprocessor compares the true (actual) measured position with the desired, and creates a position error signal representative of the error between the desired and actual position of the milling head. Next, the position error signal is fed back to the milling machine's position controller in a closed-loop manner, thereby correcting the position. This closed-loop cycle repeats as many times as is necessary to reduce the position error signal below a predetermined limit, such as ten microns.

FIGS. 24A and 24B show a top view and a side view, respectively, of an example of a one DOF articulated coordinate measuring machine (ACMM) 10. ACCM 10 has a single revolute joint comprising an encoder wheel 902 that rotates about an axis of rotation that is substantially perpendicular to working surface 8. Riser 904 is attached to wheel 904, and holds probe arm 28 with probe tip 30. Bearing means 906 comprises two ball bearings and a shaft. Sensor 5 detects the motion of marks disposed on 'the circumference of wheel 902 as the wheel rotates. This example of a single DOF ACCM can be used to evaluate the performance of another CMM by tracing out a highly accurate circle (not shown), defined by the motion of probe tip 30, where the plane of the circle is parallel to the working surface 8. A method of performing this task is described in U.S. Pat. No. 5,341,574, "Coordinate Measuring Machine Test Standard Apparatus and Method", by L. Bieg (same as the present co-inventor), which is herein incorporated by reference.

Figure 25A:
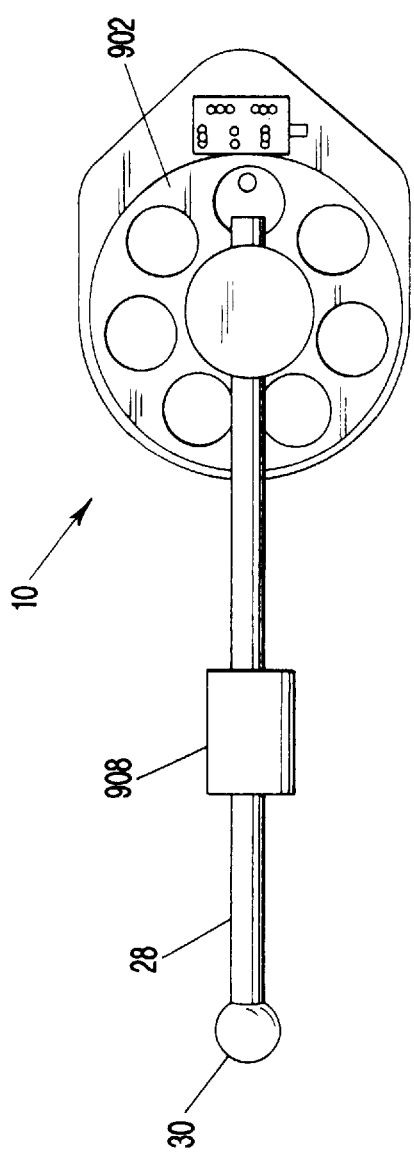
FIG. 25A shows a schematic top view of an example of an articulated coordinate measuring machine, according to the present invention.
Figure 25B:
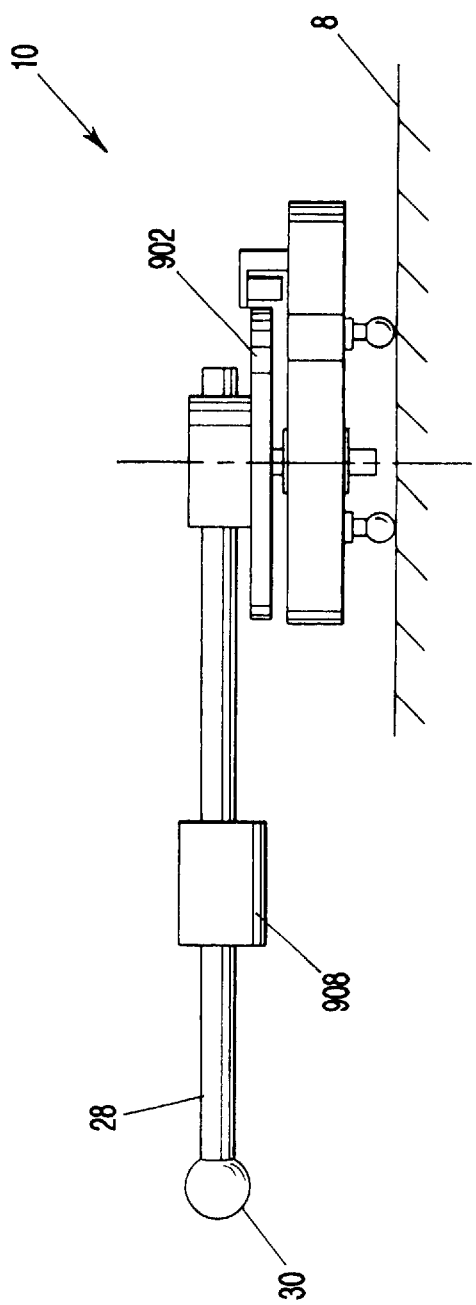
FIG. 25B shows a schematic side view of an example of an articulated coordinate measuring machine, according to the present invention.

FIGS. 25A and 25B show a top view and a side view, respectively, of an example of a two DOF articulated coordinate measuring machine (ACMM) 10. Similar to FIGS. 24A and 24B, ACCM 10 has a single revolute joint comprising an encoder wheel 902 that rotates about an axis of rotation that is substantially perpendicular to working surface 8. Probe arm 28 comprises linear measuring means 908 for measuring changes in the length of arm 28 (e.g. LVDT or laser interferometer). This example of a two DOF ACCM can be used to evaluate the performance of a movable machine member as it is driven to trace out a circle, where the plane of the circle is parallel to the working surface 8. Deviations from a perfect circle are indicated by changes in the length of probe arm 28 as measured by means 908.

Figure 26:
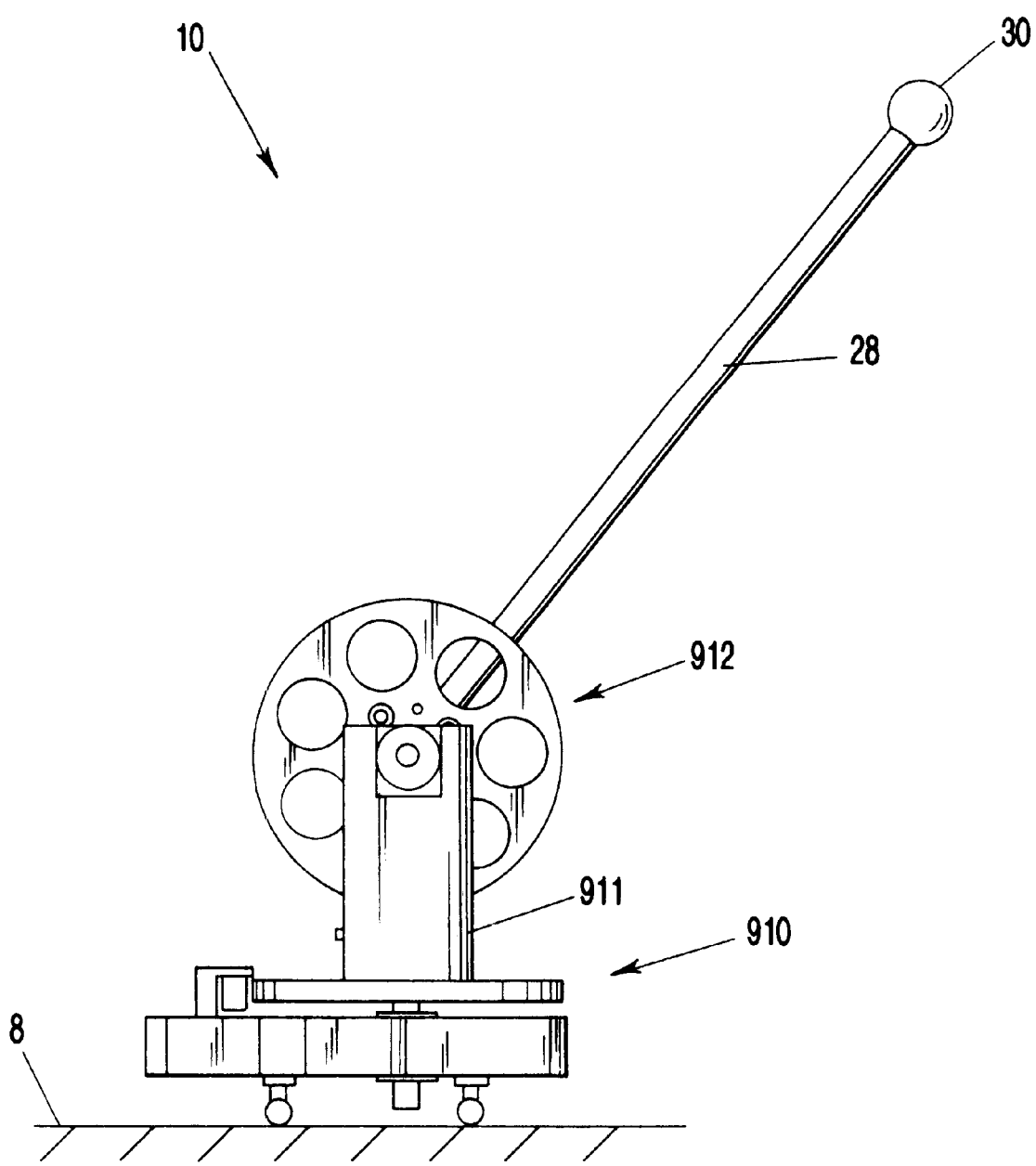
FIG. 26 shows a schematic side view of an example of an articulated coordinate measuring machine, according to the present invention.

FIG. 26 shows a side view of an example of a two DOF articulated coordinate measuring machine (ACMM) 10. ACCM 10 has a first revolute joint 910, comprising an encoder wheel and sensor, that has an axis of rotation perpendicular to working surface 8. ACCM 10 further has a second revolute joint 912, also comprising an encoder wheel and sensor, that has an axis of rotation that is parallel to working surface 8. These two revolute joints, 910 and 912, are serially linked by support arm 911. This example of a two DOF ACCM can be used to evaluate the performance of another CMM by tracing out a highly accurate hemispherical surface (not shown), defined by the motion of probe tip 30.

Figure 27:
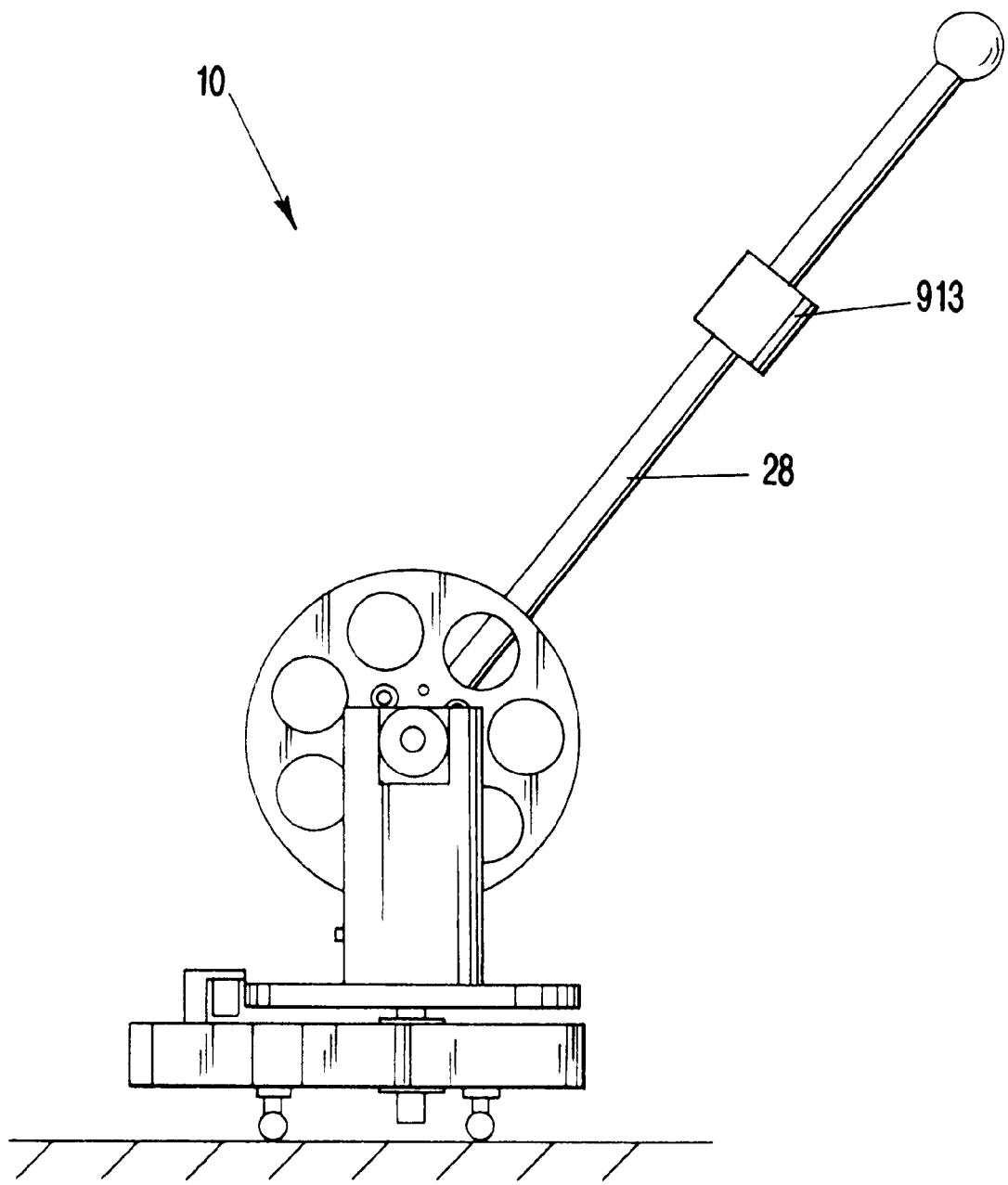
FIG. 27 shows a schematic side view of an example of an articulated coordinate measuring machine, according to the present invention.

FIG. 27 shows a side view of an example of a three DOF articulated coordinate measuring machine (ACMM) 10. FIG. 27 is similar to FIG. 26, except that probe arm 28 comprises linear measuring means 913 for measuring changes in the length of arm 28 (e.g. LVDT or laser interferometer). This example of a three DOF ACCM can be used to evaluate the performance of a movable machine member as it is driven to trace out a hemispherical surface. Deviations from a perfect hemispherical surface are indicated by changes in the length of probe arm 28 as measured by means 913.

Figure 28:
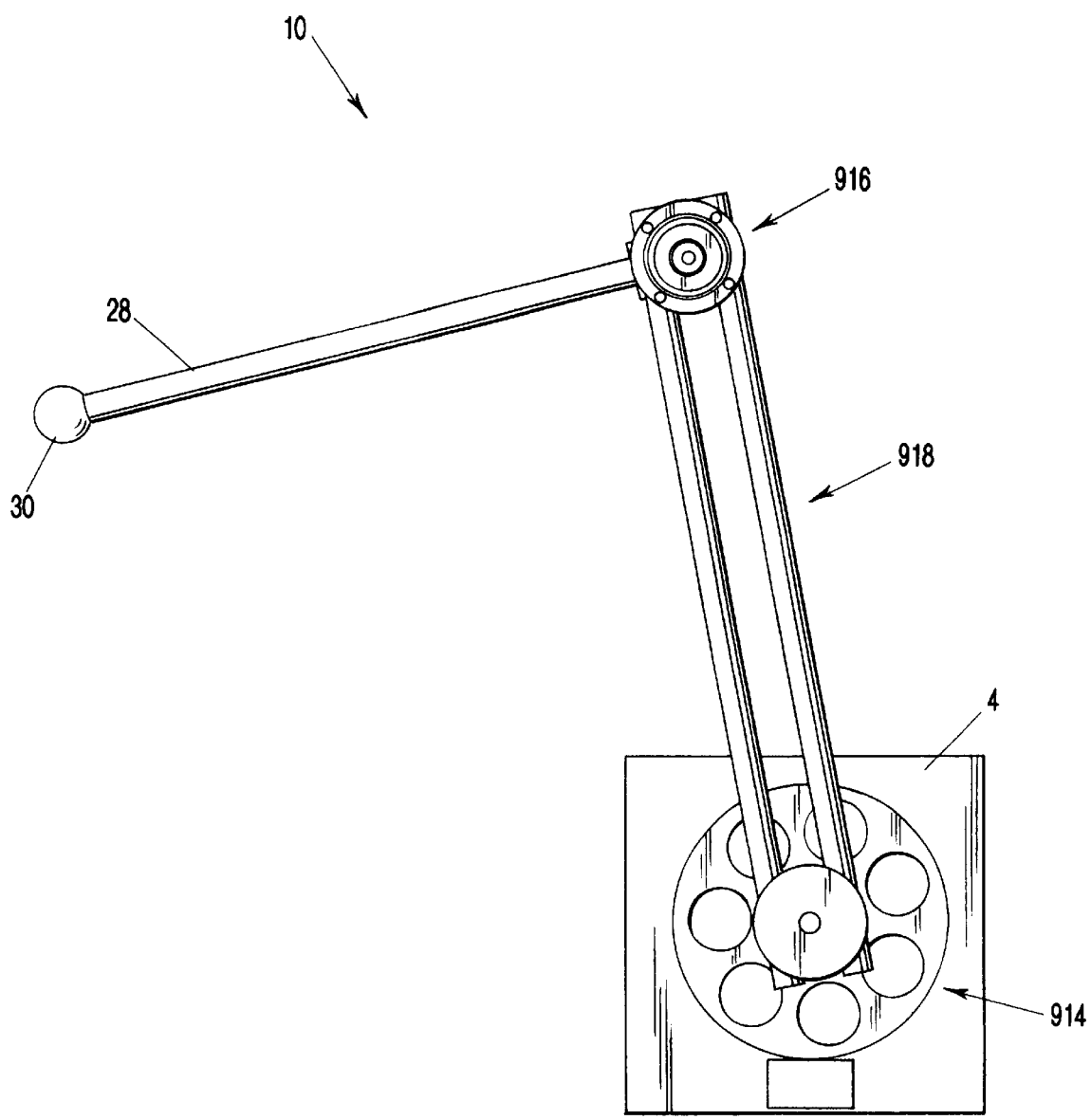
FIG. 28 shows a schematic side view of an example of an articulated coordinate measuring machine, according to the present invention.

FIG. 28 shows a top view of an example of a two DOF articulated coordinate measuring machine (ACMM) 10. FIG. 27 is similar to FIG. 12, except that both axes of revolution for revolute joints 914 and 916 are perpendicular to working surface 8. This example of a two DOF ACCM can be used to trace the X-Y planar contour of a solid part lying on working surface 8, which can be a table.

Figure 29:
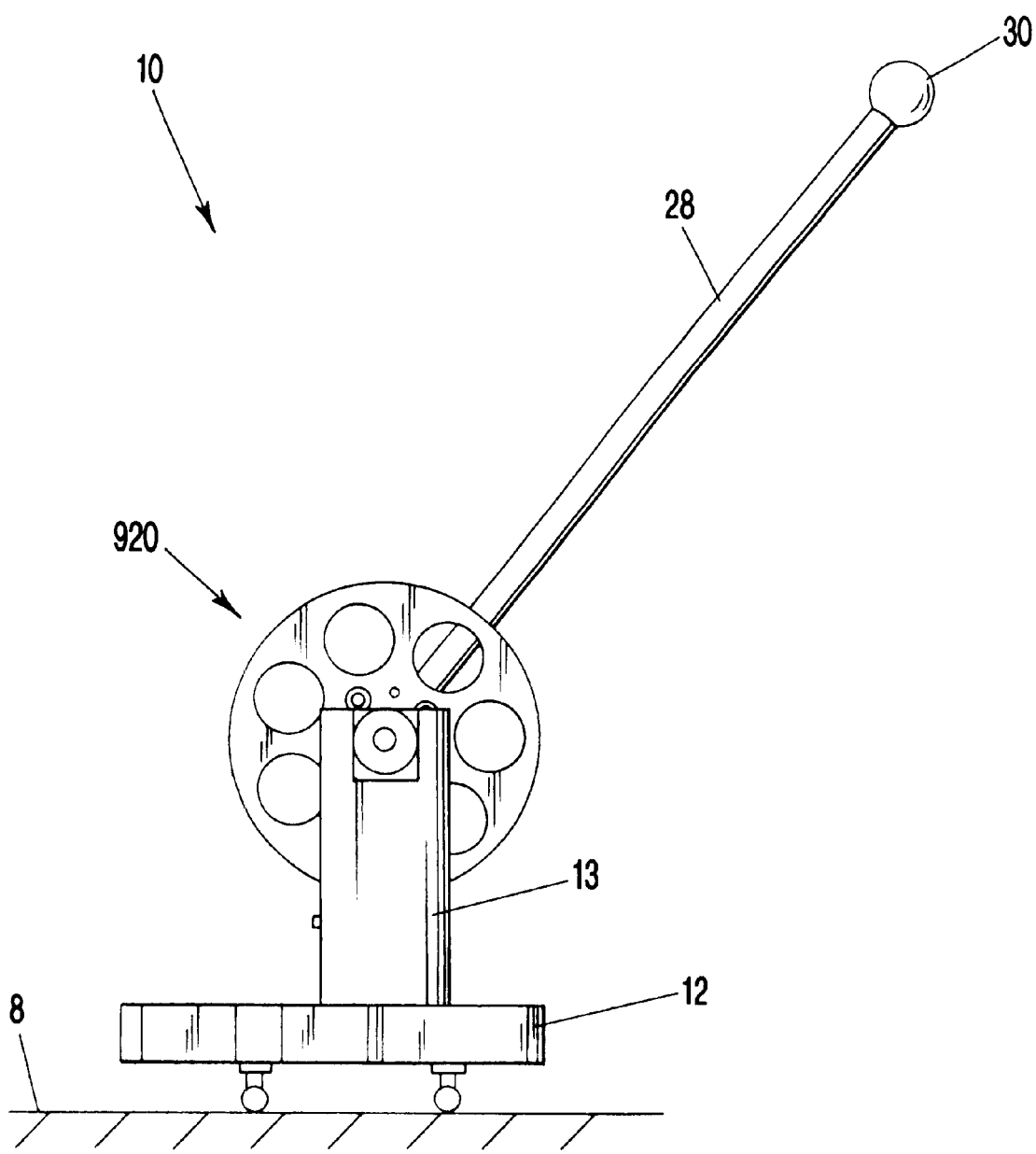
FIG. 29 shows a schematic side view of an example of an articulated coordinate measuring machine, according to the present invention.

FIG. 29 shows a side view of an example of a single DOF articulated coordinate measuring machine (ACMM) 10. FIG. 27 is similar to FIG. 26, except that riser 13 is rigidly fixed to base 12, and does not rotate. The axis of revolution for revolute joint 920 is parallel to working surface 8. This example of a single DOF ACCM can be used to evaluate the performance of another CMM by tracing out a highly accurate half-circle (not shown) defined by the motion of probe tip 30, where the plane of the half-circle is perpendicular to the working surface 8.

Figure 30:
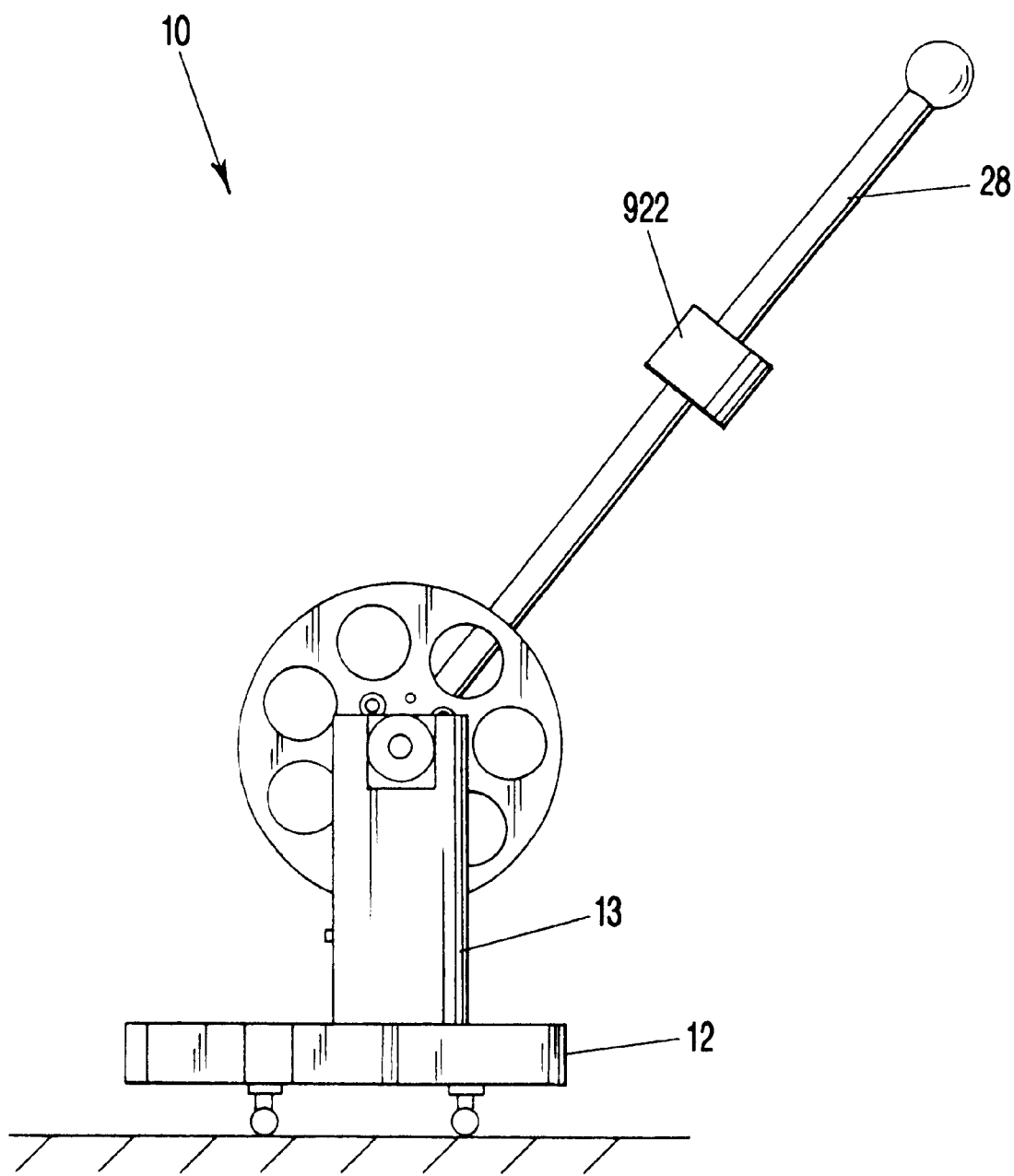
FIG. 30 shows a schematic side view of an example of an articulated coordinate measuring machine, according to the present invention.

FIG. 30 shows a side view of an example of a two DOF articulated coordinate measuring machine (ACMM) 10. FIG. 30 is similar to FIG. 29, except that probe arm 28 comprises linear measuring means 922 for measuring changes in the length of arm 28 (e.g. LVDT or laser interferometer). This example of a two DOF ACCM can be used to evaluate the performance of a movable machine member as it is driven to trace out a half-circle arc. Deviations from a perfect half-circle arc are indicated by changes in the length of probe arm 28 as measured by means 922.

The present invention can comprise a method of independently evaluating the spatial positional performance of a movable machine member, comprising: a) kinematically mounting the base of an articulated coordinate measuring machine to a working surface at a location having a fixed spatial relationship to a home position on the machine, wherein the coordinate measuring machine has a probe tip and at least two serially-linked revolute joints; b) pivotally mounting the probe tip to the movable machine member; c) commanding the machine's position controller to move the movable machine member to a home position; d) initializing the coordinate system of the coordinate measuring machine while at the home position; e) commanding the machine's position controller to move the movable machine member to a desired position; f) measuring the position of the movable machine member with the coordinate measuring machine to create a true position; g) comparing the true position with the desired position to create a position error; and h) repeating steps e) through g) as often needed to evaluate the spatial positional performance of the movable machine member.

The step f) of measuring the position of the movable machine member can be performed dynamically while the movable machine member is moving. In this example, the ACMM takes a "snapshot" of the position of the machine member while it is moving.

Alternatively, the step f) of measuring the position of the movable machine member can be performed statically after the movable machine member has completed the previous step e) of moving to a desired position and has stopped moving.

The present invention can comprise a method of: a) using a reference metrology tool having an accuracy that is greater than the accuracy of the coordinate measuring device to calibrate the device; b) generating a set of best-fit kinematic parameters that minimizes the average global error within the device's workspace; c) storing the set of best-fit kinematic parameters within a microprocessor; and d) using the set of best-fit kinematic parameters for computing the position of the probe tip. Additionally, the following steps may be performed: e) after performing step d), then calculating a residual error by comparing the apparent position of the probe tip as reported by the calibrated coordinate measuring device using the set of best-fit kinematic parameters from step b) above, to the true position of the probe tip as measured by the reference metrology tool; f) creating a residual error map by performing step e) for a plurality of probe tip positions; g) storing the residual error map within the microprocessor; and h) correcting, in real-time, the apparent position of the probe tip by using the residual error map to adjust the probe's position so that the actual error is reduced below an acceptable limit.

The present invention can comprise a method of: a) kinematically mounting the base of a second articulated coordinate measuring device to a reference surface at a second location having a second fixed spatial relationship to the home position on the machine, the second coordinate measuring device having a second probe tip; b) pivotally mounting the second probe tip to a second position on the movable member; c) commanding the machine's position controller to move the movable member to a home position; d) initializing both the first and the second coordinate systems of the coordinate measuring devices while at the home position, while accounting for the separation distance between the first and second positions; e) commanding the machine's position controller to move the movable member to a desired position; f) measuring a first true position of the movable member with the first coordinate measuring device; g) measuring a second true position of the movable member with the second coordinate measuring device; h) comparing the first and second true positions with the desired position to create a pair of position errors; i) comparing the first and second true positions with each other to create an orientation error; i) repeating steps e) through g) as often needed to evaluate the spatial positional and orientational performance of the movable machine member.

The present invention can comprise a method of providing independent, real-time, position feedback control of a movable machine member, comprising: a) kinematically mounting the base of a articulated coordinate measuring device to a reference surface at a location having a fixed spatial relationship to a home position on the machine, the coordinate measuring device having a probe tip, and having at two serially-linked revolute joints; b) pivotally mounting the probe tip to the movable member; c) commanding the machine's position controller to move the movable member to the home position; d) initializing the coordinate system of the coordinate measuring device while at the home position; e) commanding the machine's position controller to move the movable member to a desired position; f) measuring the true position of the movable member with the coordinate measuring device; h) comparing the true position with the desired position to create a position error; i) feeding back the position error to the position controller of the machine's movable member; j) adjusting the position of the movable member to reduce the position error below an acceptable limit; and k) repeating steps e) through j), as often needed during motion of the movable machine member. The acceptable limit can be less than or equal to ten microns.

The step f) of measuring the position of the movable machine member can be performed dynamically while the movable machine member is moving. In this example, the ACMM takes a "snapshot" of the position of the machine member while it is moving.

Alternatively, the step f) of measuring the position of the movable machine member can be performed statically after the movable machine member has completed the previous step e) of moving to a desired position and has stopped moving.

The present invention can comprise a method of using a movable machine member to perform automatic, machine-guided inspection of the spatial dimensions of a part, comprising: a) mounting the base of a articulated coordinate measuring device to a reference surface at a location having a fixed spatial relationship to a home position on the machine, the coordinate measuring device having a probe tip, and having at two serially-linked revolute joints; b) pivotally mounting the probe tip to the movable member; c) commanding the machine's position controller to move the movable member to the home position; d) initializing the coordinate system of the coordinate measuring device while at the home position; e) commanding the machine's position controller to move the movable member, including pivotally mounted probe tip, into close proximity to a plurality of locations on the part; and f) automatically scanning the surface of the part, whereby the spatial dimensions of the part are measured and inspected. The probe tip can comprise a plurality of touch probes.

The present invention can comprise the method of performing manual inspection of the spatial dimensions of an at least partially machined part, comprising: a) mounting the base of a articulated coordinate measuring device to a reference surface at a location having a fixed spatial relationship to a home position on the machine, the coordinate measuring device having a probe tip, and having at two serially-linked revolute joints; b) at least partially machining the part; c) manually moving the movable member to the home position; d) initializing the coordinate system of the coordinate measuring device while at the home position; e) manually moving the probe tip into close proximity to a plurality of locations on the part, during a pause in machining; and f) measuring the true position of the probe tip with the coordinate measuring device; whereby the spatial dimensions of the at least partially machined part are measured and inspected. One advantage of this method is that accuracy is enhanced by not removing the at least partially machined part from the worktable and transporting it to (and from) a separate gantry or bridge-style CMM located far away from the machine tool.

The particular sizes and equipment discussed above are cited merely to illustrate a particular embodiment of this invention. It is contemplated that the use of the invention may involve components or methods having different characteristics. For example, the system using ACMM 10 can be used to precisely measure the spatial location of a moving articulated robot arm.

It is intended that the scope of the invention be defined by the claims appended hereto.

We claim:

1. A metrology system for independently evaluating the spatial positional performance of a working machine having a movable member and a position controller responsive to a command to move said movable member to a desired position, the system comprising:

an articulated coordinate measuring machine (ACMM) having at least two degrees of freedom, comprising:
a first revolute joint;

a probe arm, having a proximal end rigidly attached to the first joint, and having a distal end with a probe tip attached thereto, wherein the probe tip is rotatably coupled to the movable machine member with rotatable coupling means;

a second revolute joint;

a first support arm serially connecting the first joint to the second joint; and coordinate processing means, operatively connected to the first and second revolute joints, for calculating the spatial coordinates of the probe tip;

rotatable coupling means for rotatably coupling the probe tip to the movable machine member;

means for kinematically constraining the ACMM to a working surface; and electronic comparator means, in operative association with the ACMM's coordinate processing means and with the working machine's position controller, for simultaneously comparing the true position of the movable machine member, as measured by the true position of the probe tip, with the desired position of the movable machine member to create a position error.

2. The system of claim 1, further comprising means for measuring changes in the length of the probe arm.

3. The system of claim 2, wherein the means for measuring changes in the length of the probe arm comprises a displacement sensing transducer or a laser interferometer.

4. The system of claim 1, wherein at least one of the revolute joints comprises:

a circular encoder wheel;

bearing means for supporting the encoder wheel, while permitting free rotation of the encoder wheel about the wheel's axis of rotation;

a plurality of marks disposed around at least a portion of the circumference of the encoder wheel; and a sensor, rigidly attached to the bearing means, for detecting the motion of at least some of the marks as the encoder wheel rotates; and wherein the coordinate processing means further comprises means, operatively connected to the sensor, for converting the output of the sensor into an angle measurement.

5. The system of claim 4, further comprising a flexible encoder tape wrapped at least partially around the circumference of the encoder wheel, wherein the plurality of marks are disposed on said encoder tape.

6. The system of claim 1, further comprising:

a third revolute joint; and a second support arm serially connecting the second joint to the third joint;

wherein the coordinate processing means is additionally operatively connected to the third revolute joint.

7. The system of claim 1, further comprising magnetic means for urging the probe tip towards the rotatable coupling means.

8. The system of claim 1, wherein the movable machine member comprises a six-axis or seven-axis articulated coordinate measuring machine.

9. The system of claim 1, further comprising protective means, surrounding at least some of the articulated coordinate measuring machine, for providing a nearly constant thermal environment, and for preventing debris from contaminating the coordinate measuring machine.

10. The system of claim 1, wherein the coordinate processor means further comprises:

means for storing a set of best-fit kinematic parameters; and means for using the set of best-fit kinematic parameters for computing the probe tip's position.

11. The system of claim 10, wherein the coordinate processor means further comprises:

means for storing a residual error map; and means for correcting, in real-time, the probe tip's apparent position by using the residual error map to adjust the probe tip's reported position so that the actual error is reduced below an acceptable limit.

12. The system of claim 1, further comprising a second articulated coordinate measuring machine, having a second probe tip pivotally mounted to a second position on the movable machine member, whereby at least two additional degrees of freedom, representing the orientation of the movable machine member, can be measured.

13. The system of claim 12, further comprising a third articulated coordinate measuring machine, having a third probe tip pivotally mounted to a third position on the movable machine member, whereby all six degrees of freedom for the position and orientation of the movable machine member can be measured.

14. The system of claim 1, wherein the articulated coordinate measuring machine is portable.

15. The system of claim 1, wherein the probe tip comprises a precision spherical ball; and further wherein the rotatable coupling means constrains all three translational degrees of freedom of the ball, but allows for unconstrained rotation of the ball about all three orthogonal axes.

16. The system of claim 1, wherein the rotatable coupling means is selected from the group consisting of a low-friction three-point kinematic pivot mount for rigidly holding a spherical ball in a stable tripod-like geometry, a gimbaled geometry, a universal joint geometry, and a ball-and-socket geometry.

17. The system of claim 1, wherein the three-point kinematic pivot mount comprises three precision-machined tooling balls rigidly mounted to a body and arranged approximately 120 degree apart.

18. The system of claim 1, wherein the rotatable coupling means is inserted directly into a tool holder or end effector position on the movable machine member.

19. The system of claim 1, further comprising air bearing means for supporting at least one revolute joint.

20. The metrology system of claim 19, wherein the acceptable position error limit is less than or equal to about ten microns.

21. The system of claim 1, further comprising feedback means for feeding back the position error to the working machine's position controller, which adjusts the position of the movable machine member in a manner that reduces the position error below an acceptable limit.

22. The system of claim 21, wherein the acceptable position error limit is less than or equal to about ten microns.

23. A metrology system for independently evaluating the spatial positional performance of a working machine having a movable member and a position controller responsive to a command to move said movable member to a desired position, the system comprising:

an articulated coordinate measuring machine (ACMM) comprising:

a revolute joint, comprising:

a circular encoder wheel having an outside cylindrical surface;

bearing means for rotatably supporting the encoder wheel, while permitting free rotation of the encoder wheel about the wheel's axis of rotation;

a plurality of uniformly spaced marks disposed around at least a portion of the outside cylindrical surface of the encoder wheel; and a sensor, rigidly attached to the bearing means, for detecting the motion of at least some of the marks as the encoder wheel rotates; and a probe arm, having a proximal end rigidly attached to the encoder wheel; and having a distal end with a probe Up attached thereto; wherein the probe tip is rotatably coupled to the movable machine member with rotatable coupling means; and coordinate processing means, operatively connected to the sensor, for converting the output of the sensor into an angle measurement, and for calculating the spatial coordinates of the probe tip based on said angle measurement;

rotatable coupling means for rotatably coupling the probe tip to the movable machine member;

means for kinematically constraining the ACMM to a working surface; and electronic comparator means, in operative association with the ACMM's coordinate processing means and with the working machine's position controller, for simultaneously comparing the true position of the movable machine member, as measured by the true position of the probe tip, with the desired position of the movable machine member to create a position error.

24. The system of claim 23, further comprising means for measuring changes in the length of the probe arm.

25. The system of claim 24, wherein the means for measuring changes in the length of the probe arm comprises a displacement sensing transducer or a laser interferometer.

26. The system of claim 23, wherein the plurality of marks comprise parallel lines spaced apart a distance equal to or greater than about 20 microns.

27. The system of claim 23, further comprising an interpolator module operatively associated with the sensor for electronically interpolating in-between two adjacent marks.

28. The system of claim 27, wherein the plurality of marks comprise parallel lines spaced equal to or greater than about 20 microns apart, and further wherein the interpolator module provides an effective line spacing that is greater than or equal to about 50 nm (0.05 microns).

29. The system of claim 23, wherein the ACCM comprises a structural metal alloy having essentially zero thermal expansion coefficient, selected from the group consisting of INVAR-36, SUPER INVAR, and KOVAR.

30. The system of claim 23, wherein the circular encoder wheel has a diameter greater than or equal to about 4.5 inches.

31. The system of claim 23, wherein the circular encoder wheel comprises a plurality of weight-reducing penetrations.

32. The apparatus of claim 23, wherein the outside cylindrical surface of the circular encoder wheel comprises a precisely ground or lapped surface.

33. A method of independently evaluating the spatial positional performance of a working machine having a movable machine member and a position controller responsive to a command to move said movable member to a desired position, the method comprising:

a) kinematically mounting the base of an articulated coordinate measuring machine (ACMM) having at least two degrees of freedom to a working surface, wherein the ACMM comprises a probe tip, coordinate processing means, electronic comparator means, and rotatable coupling means for rotatably coupling the probe tip to the movable machine member;

b) rotatably coupling the probe tip to the movable machine member with the rotatable coupling means;

c) operatively connecting the electronic comparator means to the working machine's position controller and to the ACMM's coordinate processing means;

d) commanding the working machine's position controller to move the movable machine member to a home position;

e) initializing the ACMM's coordinate processing means while the movable machine member is at the home position;

f) commanding the working machine's position controller to move the movable machine member to the desired position;

g) measuring the position of the movable machine member with the ACMM to create a true position;

h) using the electronic comparator means to simultaneously compare the true position with the desired position to create a position error; and i) repeating steps f) through h) as often needed to evaluate the spatial positional performance of the working machine.

34. The method of claim 33, wherein the step g) of measuring the position of the movable machine member is performed dynamically while the movable machine member is moving.

35. The method of claim 33, wherein the step g) of measuring the position of the movable machine member is performed statically after the movable machine member has completed the previous step f) of moving to a desired position and has stopped moving.

36. The method of claim 33, wherein at least one of the revolute joints comprises:

a circular encoder wheel;

bearing means for supporting the encoder wheel, while permitting free rotation of the encoder wheel about the wheel's axis of rotation;

a plurality of marks disposed around at least a portion of the circumference of the encoder wheel;

a sensor, rigidly attached to the bearing means, for detecting the motion of at least some of the marks as the encoder wheel rotates; and coordinate processing means, operatively connected to the sensor, for converting the output of the sensor into an angle measurement.

37. The method of claim 33, wherein the articulated coordinate measuring machine has been calibrated prior to performing steps d) through i); wherein the calibration process comprises:

j) storing an initial estimate of kinematic parameters in the ACMM's coordinate processing means;

k) measuring a plurality of ultra-accurate probe tip positions using an ultra-accurate reference metrology tool that is more accurate than the ACMM;

l) using a least-squares minimization algorithm to generate a set of best-fit kinematic parameters, utilizing the ultra-accurate coordinates of the plurality of probe tip positions measured in step k), whereby the average global position error within the workspace of the calibrated ACMM is minimized; and m) storing the generated set of best-fit kinematic parameters within the ACCM's coordinate processor means, whereby the ACMM becomes calibrated.

38. The method of claim 37, wherein measuring the position of the movable machine member in step g) further comprises using a residual error map stored in the coordinate processor means of the calibrated ACMM to adjust the probe tip's reported position so that the real error in the probe tip's coordinates is reduced below an acceptable error limit; wherein the process of generating the residual error map comprises:

n) holding the probe tip in a first position;

o) generating a set of apparent coordinates of the first position of the probe tip with the calibrated ACMM:

p) independently measuring the first position of the probe tip with an ultra-accurate reference metrology tool that is more accurate than the ACMM, thereby generating a set of ultra-accurate coordinates;

q) calculating a first set of residual coordinate errors by comparing set of apparent coordinates of the first position of the probe tip with the set of ultra-accurate coordinates;

r) creating a residual error map by repeatedly performing steps n) through r) for a plurality of different probe tip positions; and s) storing the residual error map within the ACMM's coordinate processor means.

39. The method of claim 38, wherein the residual error map is represented mathematically by multi-variable polynomial functions.

40. The method of claim 38, wherein said acceptable error limit is better than about three microns.

41. The method of claim 33, further comprising after step h), and before step i), feeding back the position error to the working machine's position controller, and adjusting the position of the movable machine member in a manner that reduces the position error below an acceptable limit.

* * * * *